United States Patent
Prater et al.

(10) Patent No.: US 6,509,927 B1
(45) Date of Patent: *Jan. 21, 2003

(54) PROGRAMMABLY ADDRESSABLE IMAGE SENSOR

(75) Inventors: James S. Prater, Fort Collins, CO (US); Kevin G. Christian, Fort Collins, CO (US)

(73) Assignee: Hyundai Electronics America Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/357,944

(22) Filed: Dec. 16, 1994

(51) Int. Cl.[7] .......................... H04N 5/228; H04N 5/262
(52) U.S. Cl. ................. 348/222.1; 348/206; 348/240.2; 348/246; 348/302; 348/312
(58) Field of Search ................................ 348/240, 241, 348/242, 243, 244, 245, 246, 247, 294, 311, 317, 320, 322, 169, 170, 206, 222.1, 240.2, 302, 312; 711/3, 128, 139, 142, 144, 145; H04N 5/335, 5/225

(56) References Cited

U.S. PATENT DOCUMENTS

| | | | | |
|---|---|---|---|---|
| 4,005,443 A | | 1/1977 | Albrecht | 354/25 |
| 4,363,104 A | * | 12/1982 | Nussmeier | 364/515 |
| 4,441,125 A | * | 4/1984 | Parkinson | 348/302 |
| 4,539,598 A | * | 9/1985 | Dietrich et al. | 348/319 |
| 4,571,638 A | | 2/1986 | Schneider et al. | 358/293 |
| 4,689,823 A | * | 8/1987 | Wojcik | 382/276 |
| 4,858,020 A | * | 8/1989 | Homma | 358/451 |
| 4,942,473 A | * | 7/1990 | Zeevi et al. | 348/281 |
| 4,951,125 A | * | 8/1990 | Kojima et al. | 358/22 |
| 5,025,366 A | * | 6/1991 | Baror | 711/128 |

(List continued on next page.)

FOREIGN PATENT DOCUMENTS

| | | | | |
|---|---|---|---|---|
| WO | 9104633 | 4/1991 | | H04N/3/15 |
| WO | 9304556 | 3/1993 | | H04N/3/15 |

OTHER PUBLICATIONS

ASIC Vision; D. Renshaw, P.B. Denyer, G. Wang & M. Lu; Custom Integrated Circuits Conference; 1990.

CMOS Image Sensors for Multimedia Applications; P.B. Denyer, D. Renshaw, Wang Guoyu & Lu Mingying; Custom Integrated Circuits Conference; 1993.

*Primary Examiner*—Ngoc-Yen Vu
(74) *Attorney, Agent, or Firm*—Townsend and Townsend and Crew

(57) ABSTRACT

An image sensor having an integrated address controller for use in an electronic camera. Providing both functions on a single integrated circuit reduces the number of external pins and external circuitry required to process an image. The integrated address controller also provides several addressing modes allowing for programmable format data transfer from the image sensor. This integrated controller not only allows addressing the sensor array in a raster scan, but it also allows other addressing modes including block addressing (useful for block based compression methods like JPEG, MPEG or H.261) and region addressing (by which one could implement pan and tilt functions). Thus, this sensor and address controller combination provides data in the format required for higher level functions, as opposed to forcing the user to convert raster scan to an appropriate format using complicated external circuitry.

47 Claims, 18 Drawing Sheets

U.S. PATENT DOCUMENTS

| | | | | |
|---|---|---|---|---|
| 5,184,172 A | | 2/1993 | Miyazaki | 354/432 |
| 5,187,793 A | * | 2/1993 | Keith | 712/225 |
| 5,227,834 A | * | 7/1993 | Ishida et al. | 354/402 |
| 5,262,871 A | * | 11/1993 | Wilder et al. | |
| 5,297,270 A | * | 3/1994 | Olson | 711/139 |
| 5,300,768 A | | 4/1994 | Wakikaido et al. | 250/208.3 |
| 5,321,510 A | * | 6/1994 | Childers | 348/571 |
| 5,329,283 A | * | 7/1994 | Smith | 342/25 |
| 5,343,243 A | | 8/1994 | Maeda | 348/222 |
| 5,367,653 A | * | 11/1994 | Coyle | 711/128 |
| 5,412,422 A | * | 5/1995 | Yamada et al. | 348/218 |
| 5,436,659 A | * | 7/1995 | Vincent | 348/246 |
| 5,452,004 A | * | 9/1995 | Roberts | 348/301 |
| 5,452,109 A | * | 9/1995 | Compton | 358/482 |
| 5,461,425 A | * | 10/1995 | Fowler | 348/294 |
| 5,521,640 A | * | 5/1996 | Prater | 348/273 |
| 5,572,700 A | * | 11/1996 | Hays | 711/139 |
| 5,736,724 A | * | 4/1998 | Ju | 235/462.11 |
| 5,949,483 A | * | 9/1999 | Fossum | 348/303 |

* cited by examiner

PROGRAMMABLY ADDRESSABLE IMAGE SENSOR

TECHNICAL FIELD

The present invention relates to electronic cameras, and more particularly to an integrated image sensor array therein.

BACKGROUND OF THE INVENTION

Electronic cameras are known in the art. These cameras, in contrast to traditional 'analog' cameras that capture images on film, capture an image in electronic form. Electronic cameras typically contain some type of image detector such as a charge-coupled device (CCD) for converting light into an electrical signal. This electrical signal may then be converted to a plurality of digital signals or bits that are stored in a line memory. An external address controller is then used to access this line memory. One type of such system is described in U.S. Pat. No. 5,343,243 to Maeda, which is hereby incorporated by reference. This system has several limitations, one of which is that since a CCD is not random-accessible, but rather sequentially-accessible, a line buffer is required to buffer the CCD's output data when operating in color mode. This line buffer is then accessed using an address controller.

Other representative electronic cameras use a linear array that is physically moved with respect to a lens. Such a system is described in U.S. Pat. No. 4,571,638 to Schneider et al., and which is hereby incorporated by reference. In this type of system, an address counter is used in conjunction with a window detector to indicate the location of the sensor.

It is an object of the present invention to provide an improved electronic camera.

It is another object of the present invention to provide an improved integrated circuit for sensing images.

It is yet another object of the present invention to provide an image sensor and address controller combination as part of a single integrated circuit device.

It is still another object of the present invention to provide electrical circuitry that includes a combined image sensor and address controller.

It is still another object of the present invention to provide high-level data from an image sensor device to a controller.

It is yet another object of the present invention to provide data directly from an image sensor integrated circuit to a color processor.

It is another object of the present invention to provide an image sensor integrated circuit having built-in error detection and correction.

SUMMARY OF THE INVENTION

The present invention incorporates an address controller with an image sensor array into a single integrated circuit (IC) device. By putting both functions on one IC, fewer pins are needed and less external circuitry is required. The address controller functions described herein also allow for several addressing modes which are not supported by current cameras (analog or digital). This integrated controller not only allows addressing the sensor array in a raster scan, but it also allows other addressing modes including region addressing (by which one could implement pan and tilt functions) and block addressing (useful for block based compression methods like JPEG, MPEG or H.261). Thus, this sensor and address controller combination provides data in the format required for higher level functions, as opposed to forcing the user to convert raster scan to an appropriate format using complicated external circuitry. The address controller embedded on the image sensor chip provides row and column addresses to access desired pixels within the array. This improved image sensor integrated circuit also has built-in error detection and correction, thus providing improved and more efficient data handling capabilities.

DETAILED DESCRIPTION OF THE PREFERRED EMBODIMENT

Figure 1:
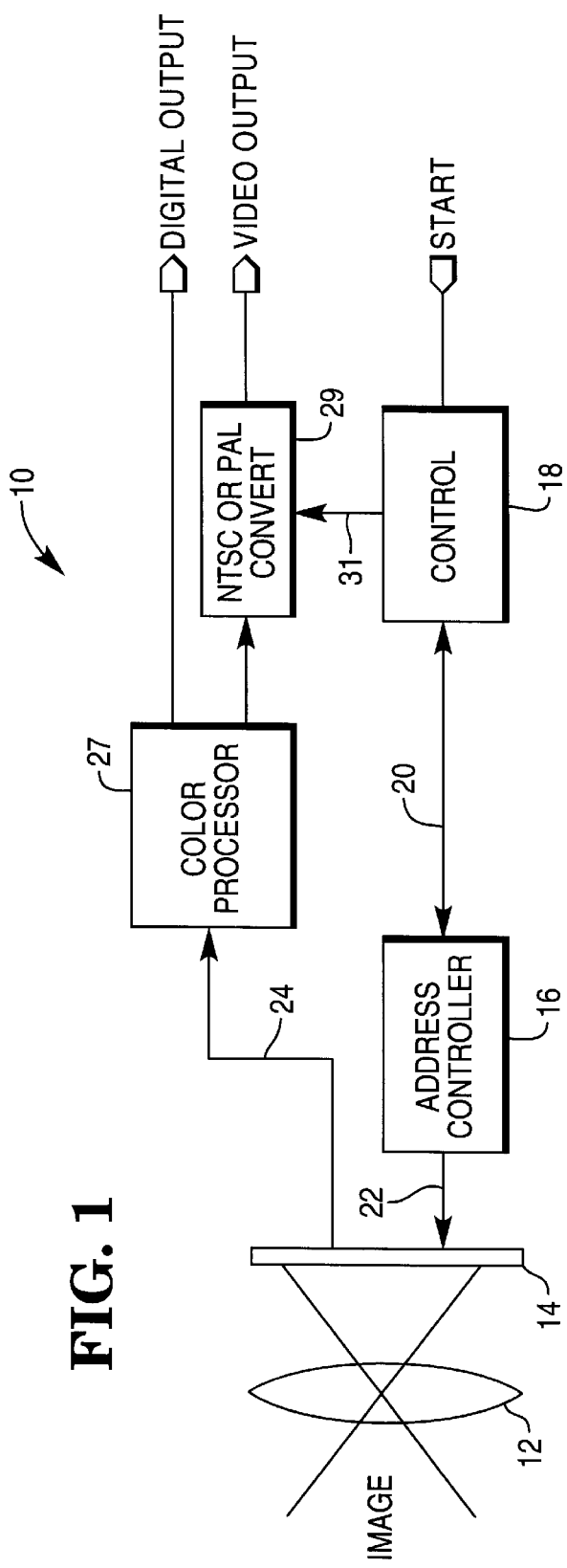
FIG. 1 is an overall system block diagram of a digital camera.

FIG. 1 shows the overall block diagram for digital camera 10. Light from an image passes through lens 12, and is radiated onto image sensor array 14. This image sensor array is controlled by address controller 16. This address controller is integrated onto the same integrated circuit device that contains the image sensor array. The address controller has a control interface 20, for connection to control logic 18. This control logic may either be dedicated control logic, or a general purpose controller such as a microcontroller or digital signal processor (DSP). In the preferred embodiment, control interface 20 includes a general purpose bus, thus allowing for memory-mapped I/O from control logic 18 to address controller 16. The master control logic, via control interface 20, activates the operation of the address controller in response to a START signal.

The address controller 16 generates image sensor addresses for addressing data within image sensor 14, and passes such addresses to the image sensor via address signal lines 22. The image sensor 14 preferably outputs data in 8 bit bytes, across signal lines 24, to a color processor 27. An 8-bit byte/pixel is used to convey pixel intensity information, although other byte sizes are also possible. Since each pixel carries information for one color component (e.g. red, green, blue), the color processor 27 combines several pixel intensities to obtain a 24-bit color value for each pixel. The color processor directly outputs digital data, and also passes such digital data to an NTSC or PAL converter, for converting digital data to video data. This video data is suitable for driving an analog display (not shown). The selection of whether to provide digital or video data output is controlled by enable signal 31, which can either come from master control logic 18 (e.g. in the case of a general controller) or from an external switch setting (e.g. in the case of a dedicated controller).

Figure 2:
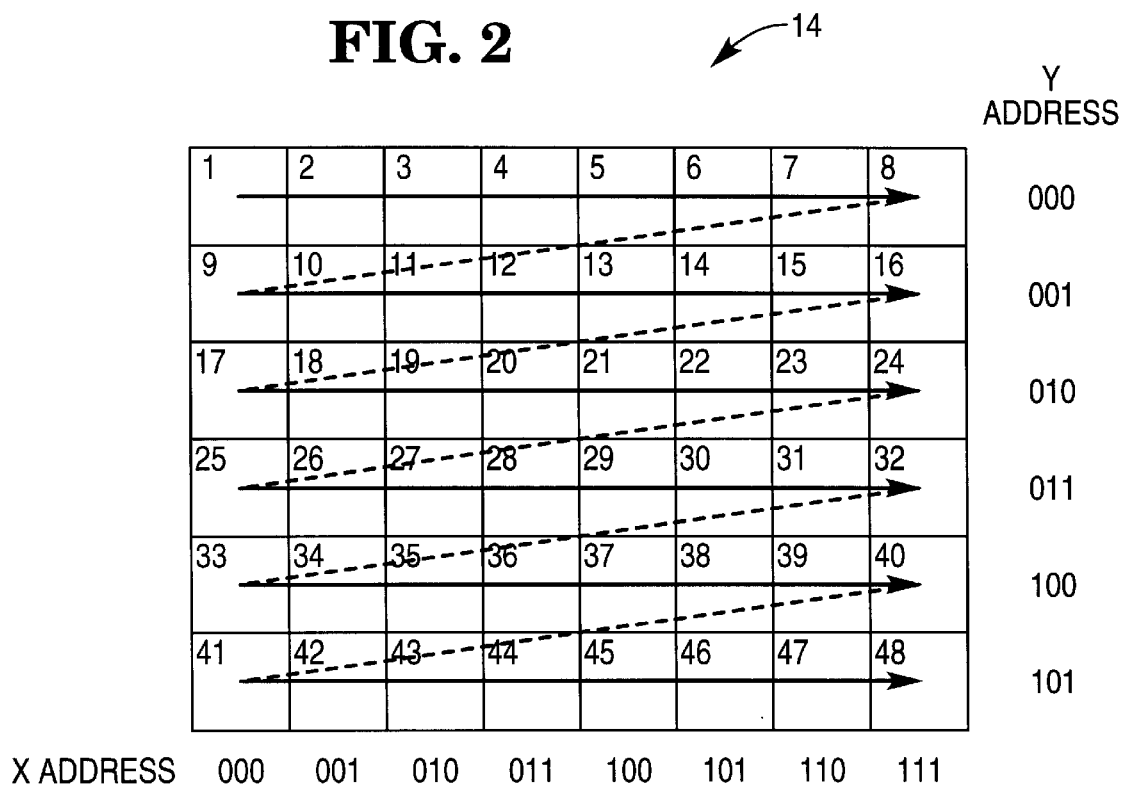
FIG. 2 shows a typical image sensor array.

The address controller 16 can take many forms. One implementation is a pair of counters incrementing row and column addresses to output pixels in raster scan order from a random access array 14. FIG. 2 shows such a raster scan sequence. A sensor array 14 is shown having 48 individual sensor locations. Larger sensor arrays may be used, but a representative array of 48 locations is described herein to avoid undue complexity which might otherwise detract from the underlying mode of operation.

The array is configured as a 6×8 array having 6 rows (Y-direction) and 8 columns (X-direction). In the normal sequence mode, data is read out beginning at sensor location #1, continuing in an X-direction up to and including sensor location #8. The next row is then read beginning at sensor location #9, again continuing in an X-direction up to and including sensor location #16. This sequence is continued for each succeeding row, and ends at sensor location #48. One such complete scan sequence is called a frame. For raster scan operation, the address controller 16 produces the proper row and column addresses to the image sensor in order that the output pixels will be output in the correct sequence, as will now be described.

Figure 3:
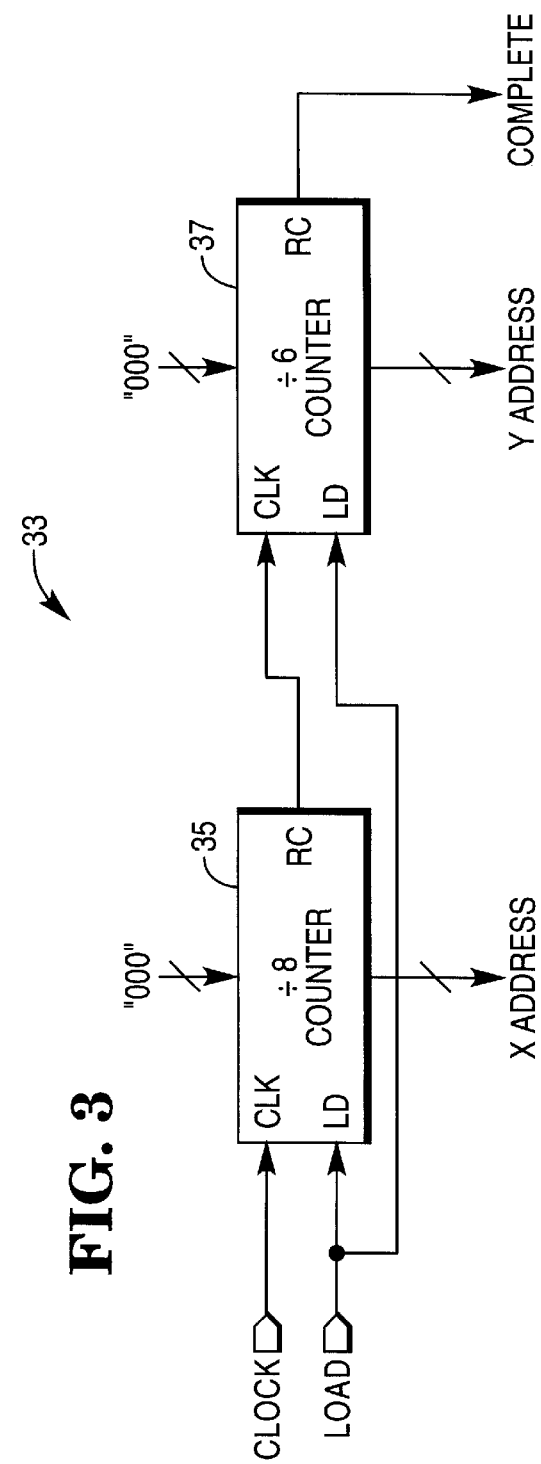
FIG. 3 shows a simple circuit for generating sequential addresses.

Referring now to FIG. 3, a simple address controller 33 is shown for generating a fixed raster scan sequence for image sensor 14. This address controller consists of a counter 35 for generating X addresses and a counter 37 for generating Y addresses. The X address counter 35 counts modulo the number of columns, in this case 8. The Y address counter 37 counts modulo the number of rows, in this case 6. When the X address counter reaches 8, it outputs a pulse on its ripple clock (RC) line and wraps around to 0. By loading both counters with zeros at the start of the frame, the clock increments the X counter to produce X addresses that start at the left side of each row (X address=binary 000) and move to the right side of each row (X address=binary 111). The RC pulse from the X counter is fed to the Y counter clock to increment the Y address at the end of each scan line, starting from the top line of the array (Y address=binary 000) and incrementing to the bottom of the array (Y address=binary 110). The Y counter then outputs a pulse on its RC line indicating that the frame raster scan is complete. In many video applications, these counters are allowed to run continuously, with the X counter and Y counter wrapping around at the end of each line and each frame, respectively, to continuously scan the array in raster scan order.

The simple raster scan controller generates X and Y addresses in a fixed order, scanning the entire array for each frame. More advanced address controllers include methods to output regions of the array under external control, as will be further described below.

Region mode

In region mode, a region of pixels is output, where the region is a subset of the array. Within that region, pixels are output in raster scan order. Current systems exists for CCD cameras with pan/tilt/zoom functions, but those systems use external controllers which are complicated by having to deal with raster output from the CCD sensor. They must reformat the raster scan data from a CCD to output a desired region. In contrast, using our random access array, the desired pixels are accessed by generating the proper row and column addresses within the image sensor IC itself. Note also that the region being output can be used for other things, such as automatic gain control (AGC) as will be further described below.

Figure 4:
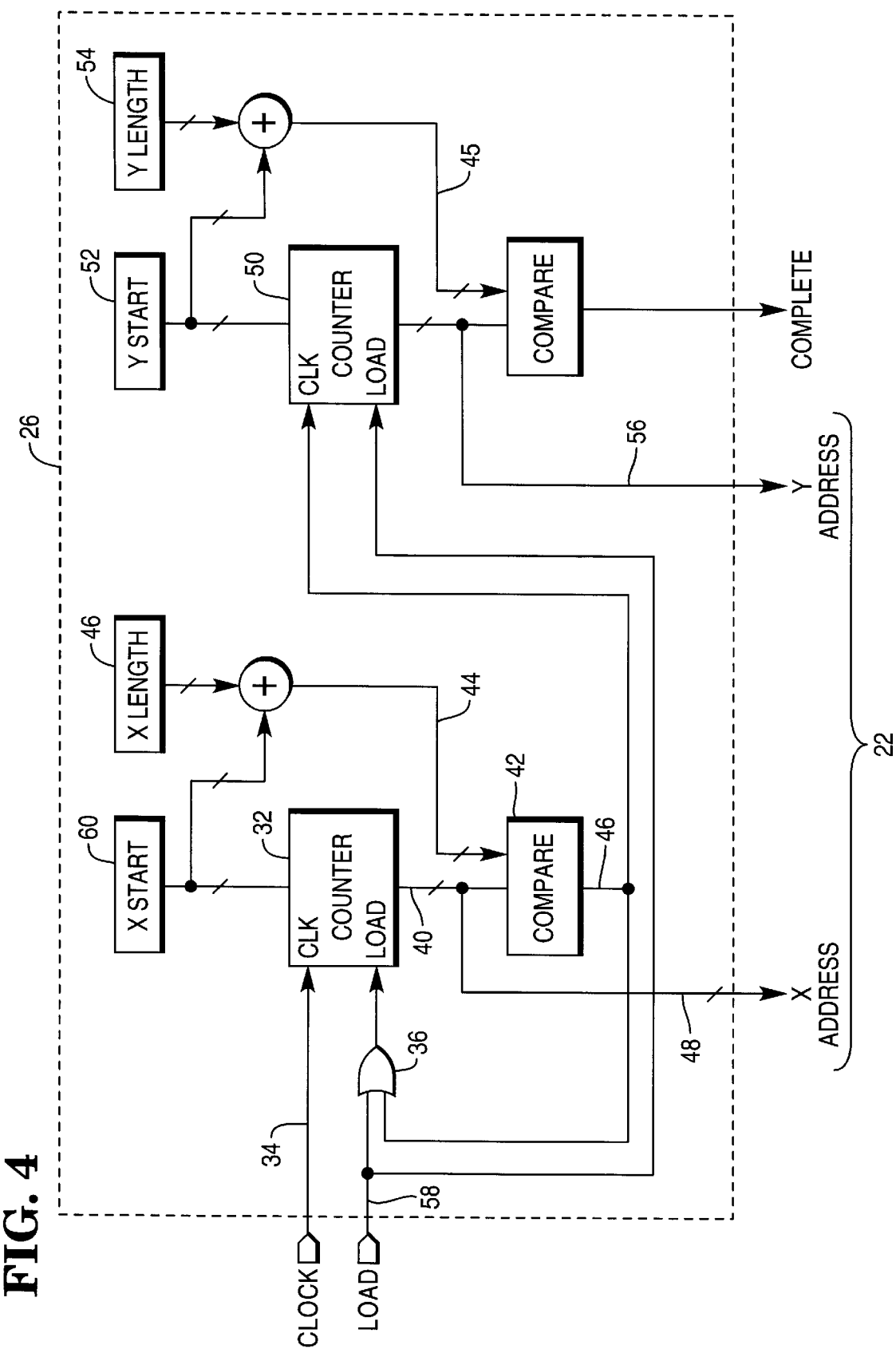
FIG. 4 shows a normal sequence address controller.

Referring now to FIG. 4, an address controller 26 is shown for generating the normal sequence of data addresses for image sensor 14. This address controller consists of two portions, one portion for generating an X-address, and one portion for generating a Y-address. These two portions are substantially the same, and differ in the signals used to drive the CLK and LOAD control signals of their respective counters.

The X-address portion has a counter 32 that has two control inputs CLK and LOAD. The CLK input is driven by control line 34, which is coupled to a system CLOCK signal. The LOAD input is driven by the output of an OR gate 36. When the output of OR gate 36 goes to a logical ONE, the value stored in XSTART register 60 is loaded into counter 32. The output 40 of the counter 32 is compared at 42 with the sum 44 of the XSTART 60 and XLENGTH 46 register values. The counter 32 is incremented once for each clock pulse of clock signal 34. The output 46 of comparator 42, when active (a logical ONE), indicates that the X-address output 48 has sequenced from the initial value of XSTART up to and including the ending X-address value, as determined by the value in the XLENGTH register 46. The XLENGTH register value indicates the number of sequential addresses to generate in the X-direction. The output 46 of the comparator 42 is coupled to one input of OR gate 36 and, when active, causes the counter 32 to be reloaded with the value stored in the XSTART register 60. This in effect resets counter 32 with the XSTART value, for processing the next row of pixels in the image sensor. The output 46 of comparator 42 is also coupled to the CLK input of counter 50 in the Y-portion. Thus, counter 50 is incremented at the completion of each scan line in the X-direction, in order to increment the Y-address to scan the next row. The remaining part of the Y-portion operates similar to that of the X-portion, but uses YSTART 52 and YLENGTH 54 register values. The X-address 48 and Y-address 56 are coupled to the image sensor array across signals lines 22 of FIG. 1.

This address controller 26 produces X and Y addresses in raster scan order for any rectangular region of the array defined by the values in the XSTART, YSTART, XLENGTH and YLENGTH registers. For a raster scan of the entire image array shown in FIG. 2, the XSTART and YSTART values would both be binary '000' (the starting array location for the first scan line) and the XLENGTH and YLENGTH values would be binary '1000' and binary '0110' respectively. In the particular controller shown in FIG. 4, these values are 'hard wired' into the registers, but this limitation is included only to simplify this example. A controller with registers that are loaded externally will be shown later.

If only a portion of the image array shown in FIG. 2 is desired to be output, the XSTART, YSTART, XLENGTH and YLENGTH registers can be loaded with values other than those required for a complete raster scan of the image array. For instance, if only the sixteen pixels in the lower right corner of the array (bounded by pixels 21, 24, 45 and 48) were to be output, the XSTART register would contain binary value '100', the YSTART register would contain binary value '010' and both the XLENGTH and YLENGTH registers would contain binary value '100'. Thus, any rectangular region of pixels in the image array can be output in raster scan order by putting values into the XSTART, YSTART, XLENGTH and YLENGTH registers which correspond to the desired region of the image array.

Figure 5:
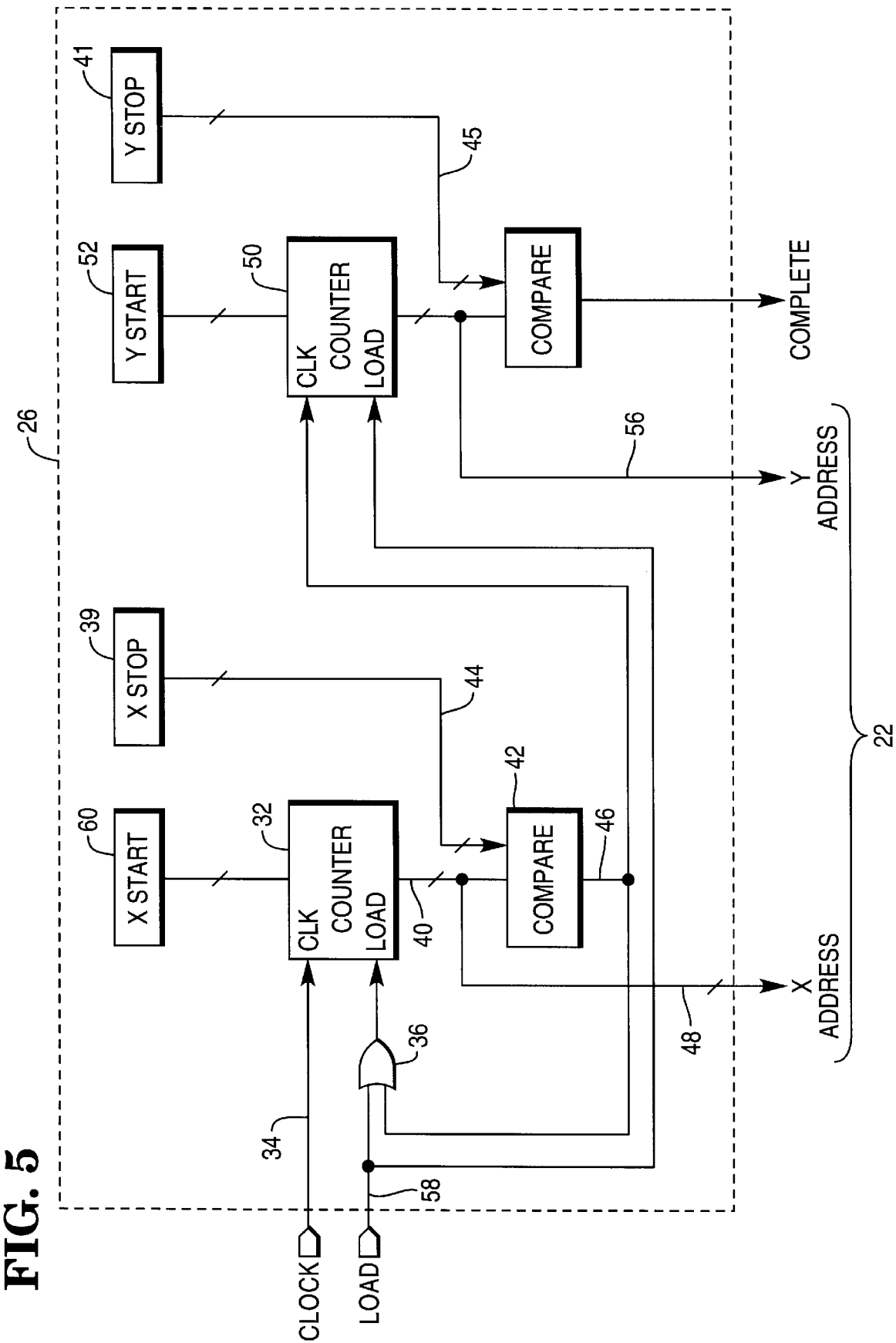
FIG. 5 shows an alternate embodiment of the normal sequence address controller of FIG. 4.

A less complex variation on the address controller of FIG. 4 is shown in FIG. 5. This address controller uses an XSTOP register 39 and a YSTOP register 41 instead of the XLENGTH and YLENGTH registers of the controller in FIG. 4. The value of XSTOP equals the value of XSTART+XLENGTH, which was the sum 44 in FIG. 4. Likewise the value of YSTOP equals YSTART+LENGTH, which was the sum 45 in FIG. 4. Although this is a simplification of the address controller, it is less flexible in certain applications, as will be seen below.

To initiate operation of the address controller 26 of FIG. 4, an active (logical ONE) load signal is asserted at 58, thus loading the X counter 32 and Y counter 50 with initial starting values maintained in registers 60 and 52, respectively. This load signal may come from a user pressing a button on the camera to initiate image processing, or from a dedicated controller. Such dedicated controller is shown at 28 in FIG. 6, and has as inputs thereto a START signal driven by an external switch or button (or alternatively, by a master controller/processor), a COMPLETE signal driven by the address controller 26 of FIG. 4, and a SYSTEM CLOCK signal generated from a system clock. The outputs of this dedicated controller 28 are LOAD, which is coupled to the LOAD input of FIG. 4, and CLOCK, which is coupled to the CLOCK input of FIG. 4. Although numerous types of dedicated controllers are possible for generating the LOAD and CLOCK signals from the START, COMPLETE and SYSTEM CLOCK signals, the preferred dedicated controller is shown in FIG. 7. This dedicated controller is preferably embedded with the combined address controller/image sensor combination, and can be viewed as a front-end to such integrated circuit.

Figure 7:
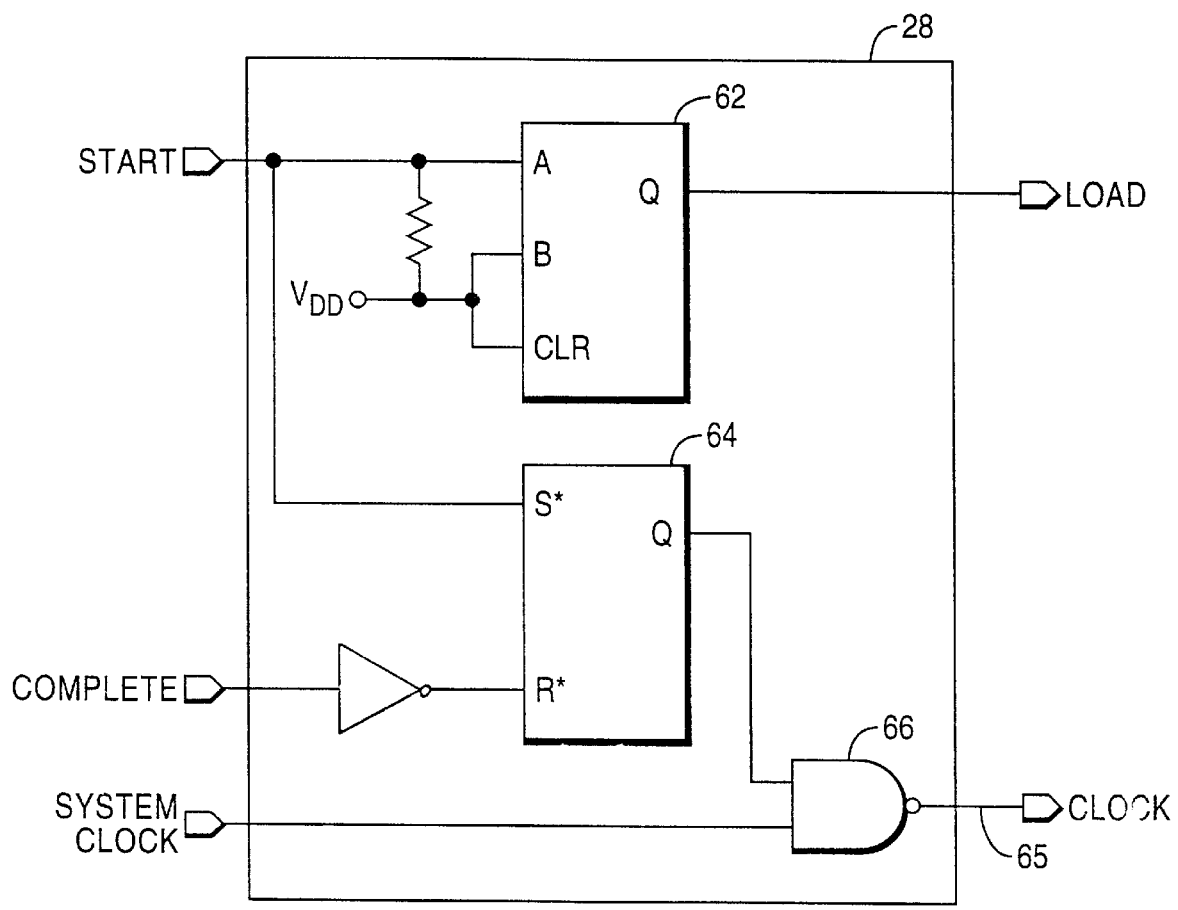
FIG. 7 shows the internal structure of a dedicated master controller.
Figure 8:
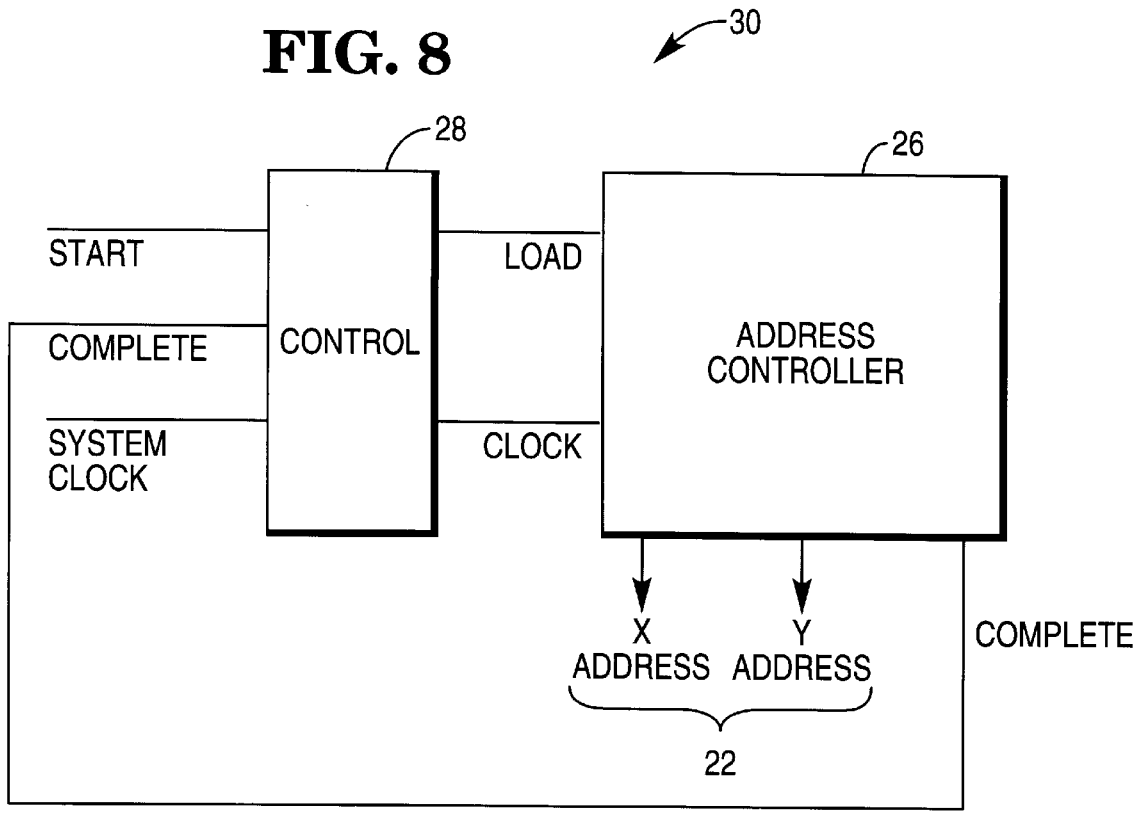
FIG. 8 shows a combined dedicated master controller and address controller.

Referring now to FIG. 7, an embedded front-end controller 28 comprises a monostable multibrivator (one-shot) 62, similar in function to the Texas Instruments 74LS123, an S*-R* flip-flop 64, similar in function to the Texas Instruments 74LS279, and a NAND gate 66. The START signal is coupled to the A input of one-shot 62, and to the S* input of flip-flop 64. When the START signal goes active (logical ZERO), a positive pulse is generated at the Q output, and hence the LOAD signal has a positive pulse signal transmitted to the LOAD input of the address controller 26 of FIG. 4. This active high logic level initiates loading of the initial XSTART and YSTART values into the controller of FIG. 4, as previously described. A logical ZERO on the START input is also coupled to the S* input of flip-flop 64, causing the Q output to be set to a logical ONE. This Q output is coupled to one input of NAND gate 66, and thus allows for the SYSTEM CLOCK input signal to pass through the NAND gate 66 to the CLOCK output line. This CLOCK output signal provides a clock signal 34 for the address controller shown in FIG. 4. When the address controller 26 (FIG. 4) has completed the sequence scanning, it generates a COMPLETE signal, which is coupled to the COMPLETE input signal of dedicated controller 28. An active (logical ONE) signal on the COMPLETE line causes flip-flop 64 to be reset, causes the Q output to go to a logical ZERO and thus disables the CLOCK output signal 65. A new scan sequence can then be initiated by another activation of the START signal. The combined front-end control logic and address controller is shown at 30 in FIG. 8.

To output a region, XSTART, YSTART, XLENGTH and YLENGTH values are preferably provided to the address controller by a general purpose controller. The address controller then generates addresses to the image sensor such that the particular region can be output by itself.

Figure 6:
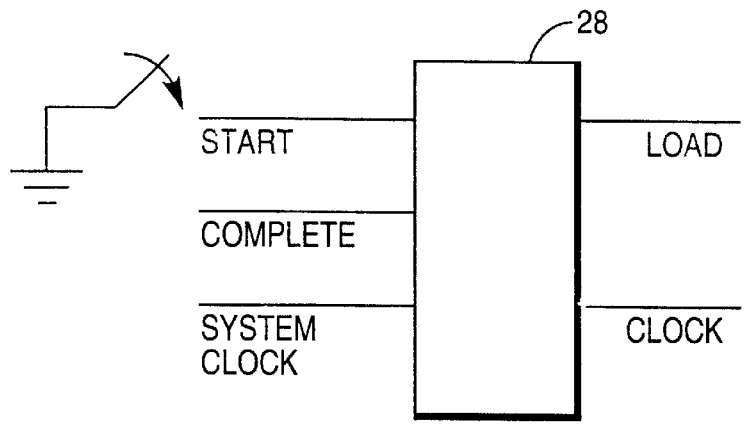
FIG. 6 shows interfaces of a dedicated master controller.
Figure 9:
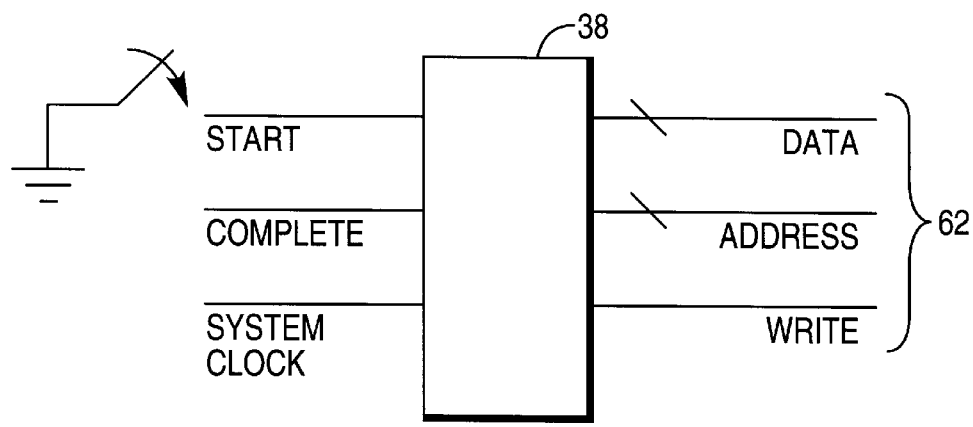
FIG. 9 shows a general purpose master controller.

Referring specifically to FIG. 9, a microcontroller or digital signal processor 38 is used in lieu of the dedicated controller 28 of FIG. 6. This microcontroller/DSP operates using similar input signals of START, COMPLETE, and SYSTEM CLOCK, but generates a different output. A general purpose processor bus interface is used between processor 38 and the address controller in order to pass data, addresses, and control signals across such interface. The address controller can be viewed as memory-mapped, in that particular addresses output on the bus 62 are used to address various registers within the address controller that are to be written into or read from.

Figure 10:
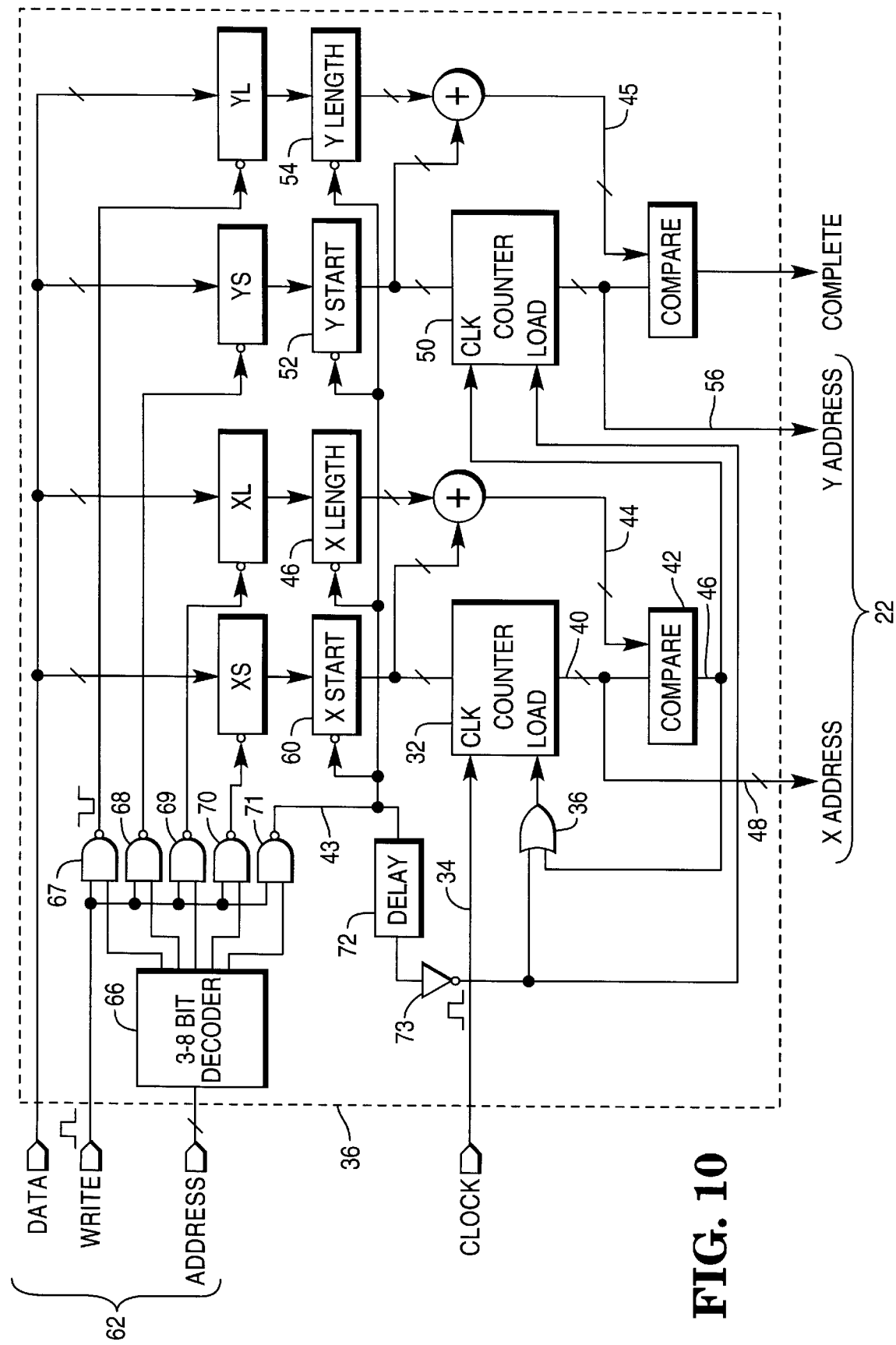
FIG. 10 shows an address controller for use with a general purpose master controller.

An address controller for use with a general purpose controller is shown at 36 in FIG. 10. It can be seen that the X-portion and Y-portions of controller 36 are similar, in both configuration and operation, to the X- and Y-portions of controller 26 in FIG. 4. However, instead of the XSTART 38, XLENGTH 46, YSTART 52 and YLENGTH 54 registers being hard wired to a fixed array size value, these registers are programmable. The data value to be written into a particular register is presented across interface 62, via the DATA lines, from controller 38. The address for a particular register is similarly presented across interface 62, via the ADDRESS lines, from controller 38. A WRITE control signal is then pulsed from controller 38 across interface 62. This WRITE control signal is combined with the outputs of the 3-to-8 bit decoder 66 to generate load signals for the registers (XS, XL, YS, YL, XSTART, XLENGTH, YSTART, YLENGTH) and X counter 32. Only three bits of the address are presented to the 3-to-8 bit decoder, and thus allow for selectively enabling one of eight possible registers (only five are actually used). The outputs of decoder 66 are each coupled to a NAND gate, along with the WRITE signal. The outputs of these NAND gates 67–70 are coupled to the (asserted low) load input of each of registers XS, XL, YS and YL. The output of NAND gate 71 is used to load registers XSTART, XLENGTH, YSTART and YLENGTH. The XS, XL, YS and YL registers are each loaded through the DATA port by presenting data values at the data port, and register locations at the ADDRESS port, and then pulsing WRITE high. The XSTART, XLENGTH, YSTART and YLENGTH registers are then loaded from the XS, XL, YS and YL registers by presenting the proper address at the address port and pulsing WRITE high. Thus, these registers in combination form a double buffer.

In a similar fashion to that just described for loading the XSTART, XLENGTH, YSTART and YLENGTH registers, the X-counter 32 is also loaded (with the value in the XSTART register 38) when it receives a LOAD signal from the inverter 73, via NAND gate 71 and delay element 72.

Figure 11:
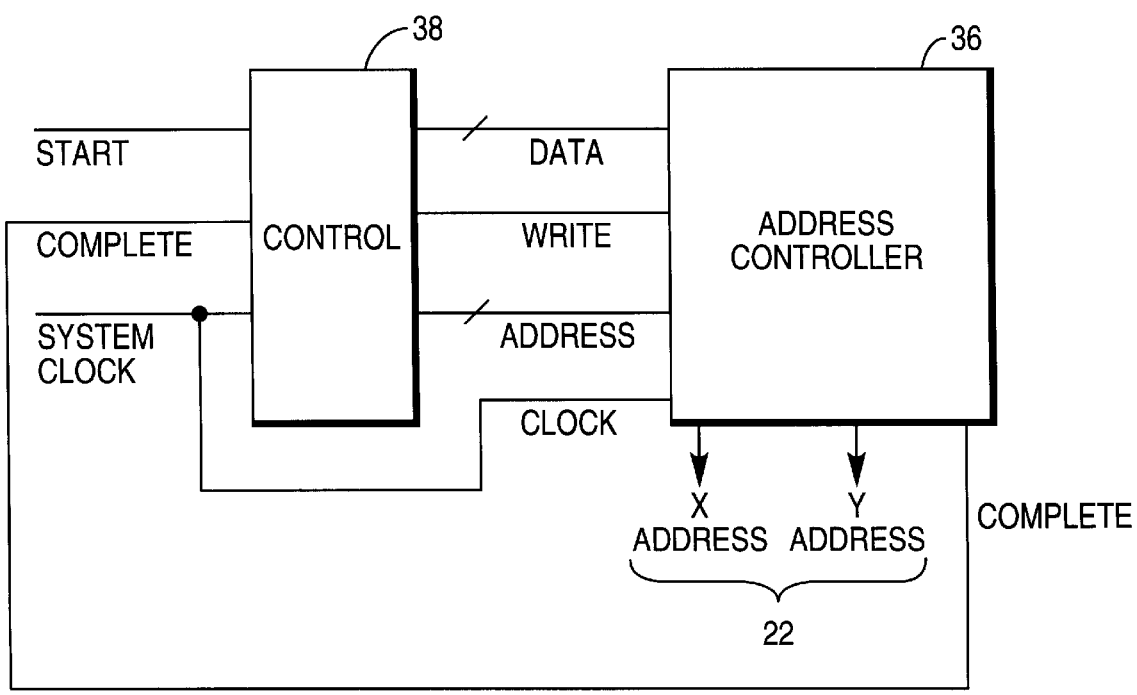
FIG. 11 shows a combined general purpose master controller and address controller.

Thus, and as shown in combination in FIG. 11, the general purpose controller 38 loads the XSTART, XLENGTH, YSTART and YLENGTH registers of address controller 36 to specify a region. The loading of any arbitrary value into these register thus results in a controller/sensor integrated circuit that is programmable. The address controller 36 then scans this region in raster scan order, by internally generating addresses for the image sensor. Any rectangular region of the image array can be output in this manner.

Figure 12A:
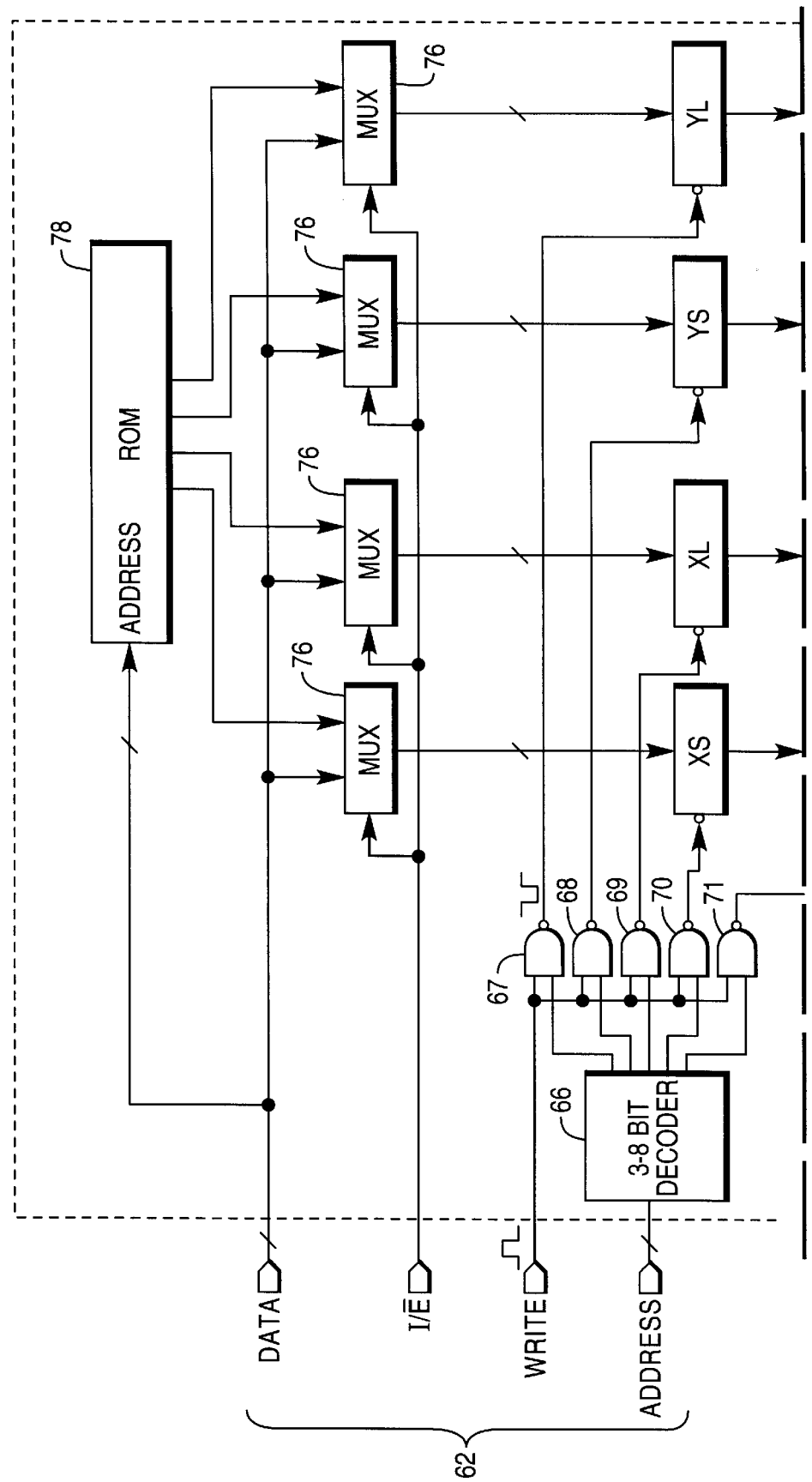
FIG. 12A–B shows an address controller having a ROM.
Figure 12B:
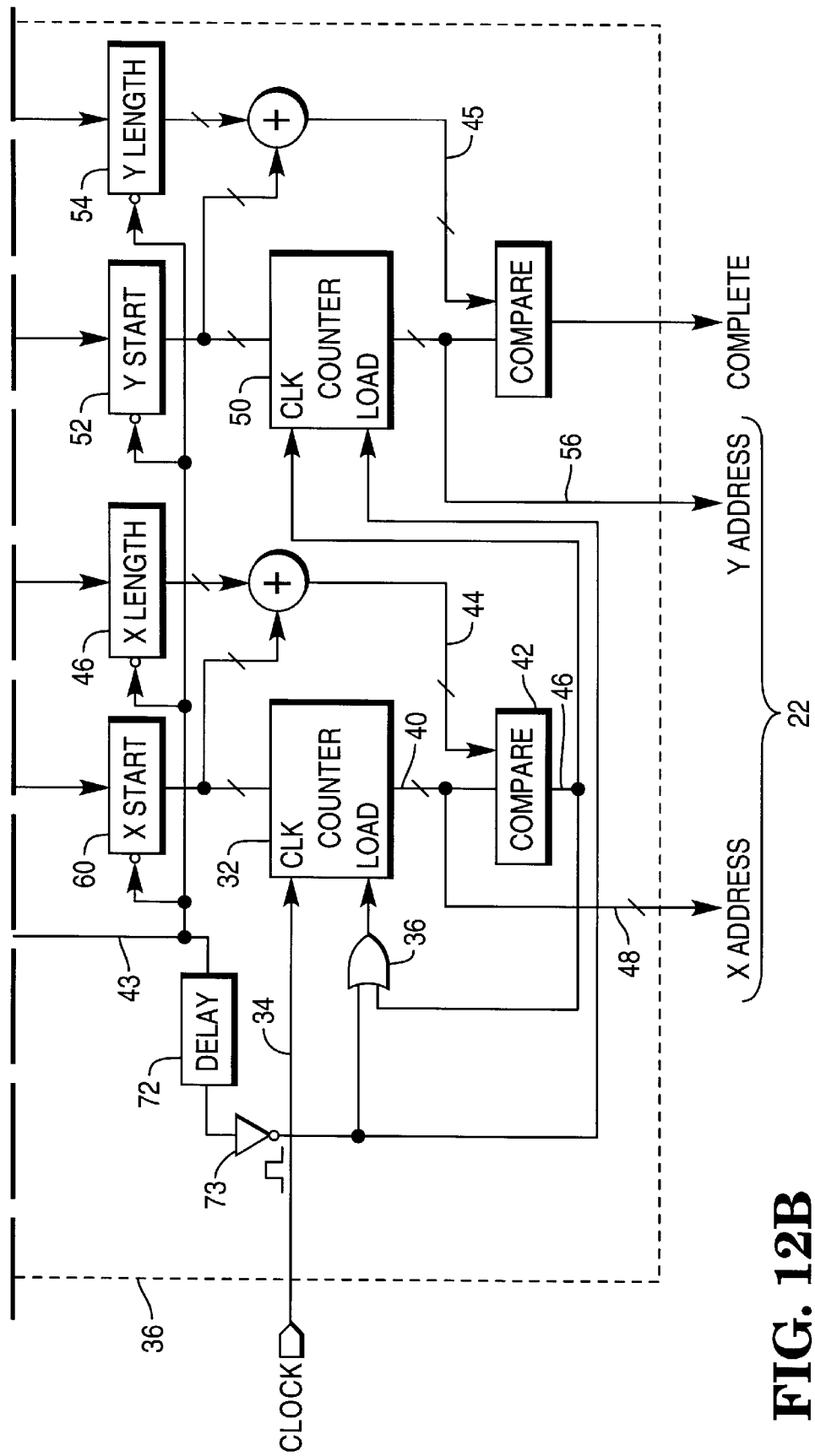

In some cases it is useful to choose one of several predetermined regions for output. For instance, automatic gain control(AGC) operations are sometimes done using a weighted average of pixels from predetermined regions of the image. For this case, the general purpose controller 38 would specify each of these regions to the address controller 36 by loading the appropriate values into the XSTART, YSTART, XLENGTH and YLENGTH registers. A more complex address controller includes a ROM to store these values internally. FIG. 12 shows such a controller. This is an extension of the controller shown in FIG. 10, where the ROM 78 and multiplexers 76 have been added so that region boundaries can be loaded either from an external source via the Data and Address lines or directly loaded from the ROM 78, using the Data lines as the ROM address. The I/E line (internal/external) is asserted to select regions from the ROM.

If non-rectangular regions are desired, the region mode controller can be loaded once for each scan line. This allows for arbitrarily shaped regions to be output, by specifying XSTART as the beginning of the line and specifying XLENGTH to set the end of the line. If YLENGTH=1, only a single line is scanned. This requires loading many addresses from an external source to define the region on a line by line basis, but the same controller used to output a rectangular region can output an arbitrary region (such as a circle).

Substitution of Good Pixels for Bad Pixels

Since an imager array is implemented with a very dense circuit layout, defects in processing will often lead to bad pixels in the array. These pixels are usually stuck at some value, often either the ground or power supply values. Such pixels appear to be stuck at bright or dark values when output. This is often not a problem with CCD imagers where several pixel values are added together prior to output. However, with imagers where each pixel value is output individually, defects are easily noticed and therefore unacceptable. Even if only a few pixels in the array are defective, such an imager cannot be used. To avoid this yield loss when a small number of pixels are defective, and therefore lower the cost of the device, the address controller is modified to detect bad pixels and substitute a neighboring good pixel value for the bad pixel value.

Figures 13, 14:
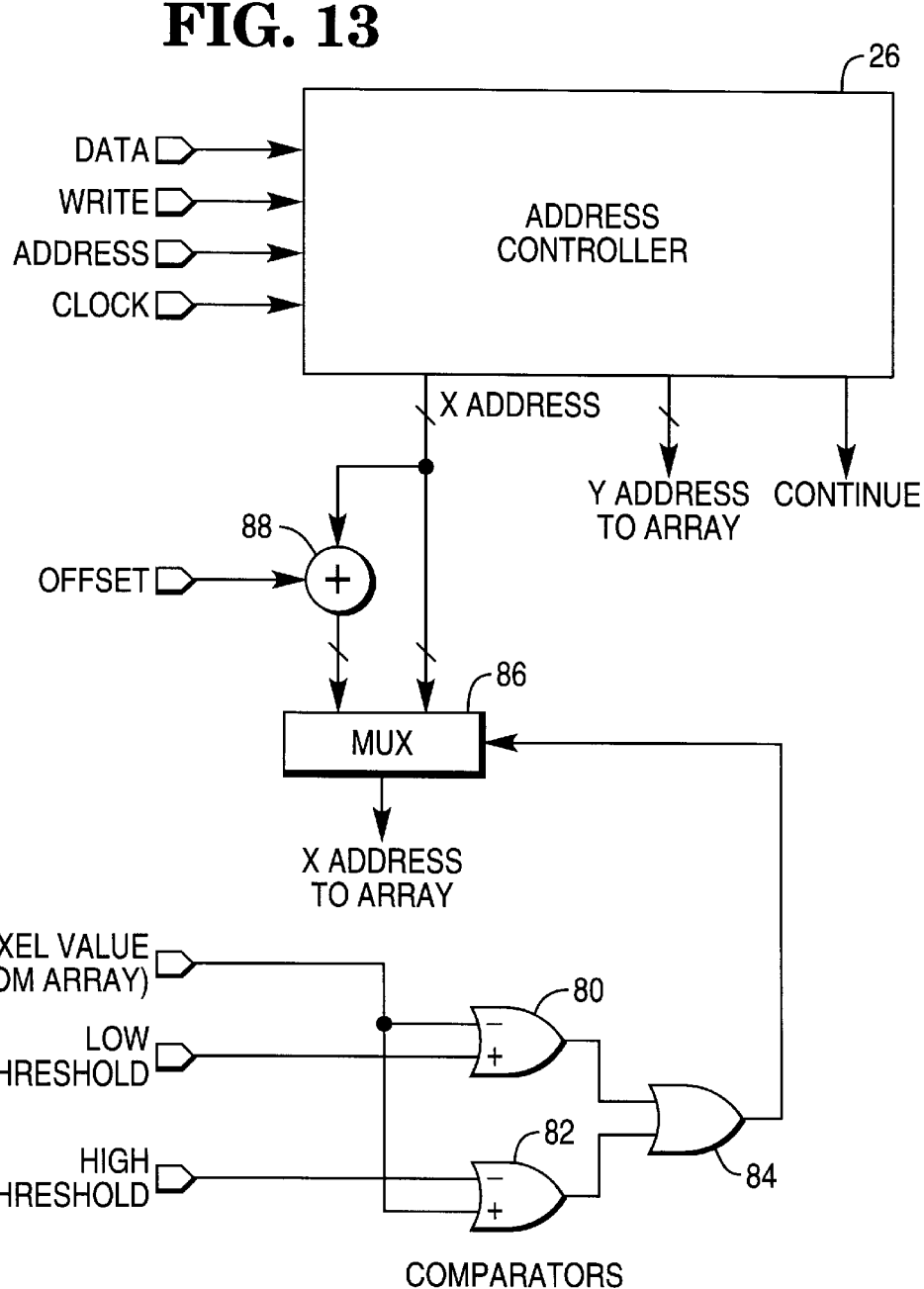
FIG. 13 shows an address controller that detects erroneous pixel values from a sensor array.
FIG. 14 shows a particular layout for a sensor array having color capability.

Because these bad pixel values often exceed the range of normal pixel values, it is possible to detect bad pixels with a pair of comparators. If a pixel value is greater than some normal maximum threshold or less than normal minimum threshold, that pixel is assumed to be nonfunctional. In a monochrome imager, any neighboring pixel to the defective pixel can be used to obtain a substitute pixel value. Since the address controller is generating pixel addresses, it is possible to generate a neighboring address for the bad pixel, and thereby substitute a good pixel value for the bad pixel value. Of course, a neighboring pixel may have a slightly different value than is desired, but in most images it will be close enough to be undetectable. A neighboring pixel is most easily obtained from the same line as the defective pixel, because there is latency associated with changing lines (just as in a ROM or RAM) which should be avoided in the substitution operation. Thus, in monochrome, the functional pixel to the left or right of the defective pixel is used as a substitute. Incrementing the pixel X address by one is easily done, by either incrementing the X counter or using an adder. An adder is shown in FIG. 13, and is preferably used since it does not interfere with the normal operation of the counter. In monochrome mode, the OFFSET is "1". When either comparator 80 or 82 detects a bad pixel, the output of the OR gate 84 goes high, and the multiplexer 86 selects the output of the adder 88 as the X address for the sensor array. Note that this operation takes place after the bad pixel value is available, so time should be included in the pixel read out operation to allow for pixel substitution if it is needed. At normal video speeds, this small delay is not a problem.

When a color imager is used, neighboring pixel values may be of the wrong color for the substitution operation. Color pixels have one of 3 or 4 color filters over them, so the address controller must determine the color of the defective pixel and substitute a functional pixel of the same color. This is accomplished by taking the pattern of color filters in the array into account. For example, if an array has a diagonal red, green and blue color filter pattern, as shown in FIG. 14, the nearest pixel on the same line as a defective pixel with the same color filter is always three pixels away to the left or right. Thus, the address controller of FIG. 13 is used with OFFSET="3". More complex X address computation would be required if the color filters were not arranged in stripes (vertical or diagonal), but the diagonal filter pattern is preferred for human color perception, so this simple modification to the controller is the preferred method.

Pan or Tilt Operations

Figure 15A:
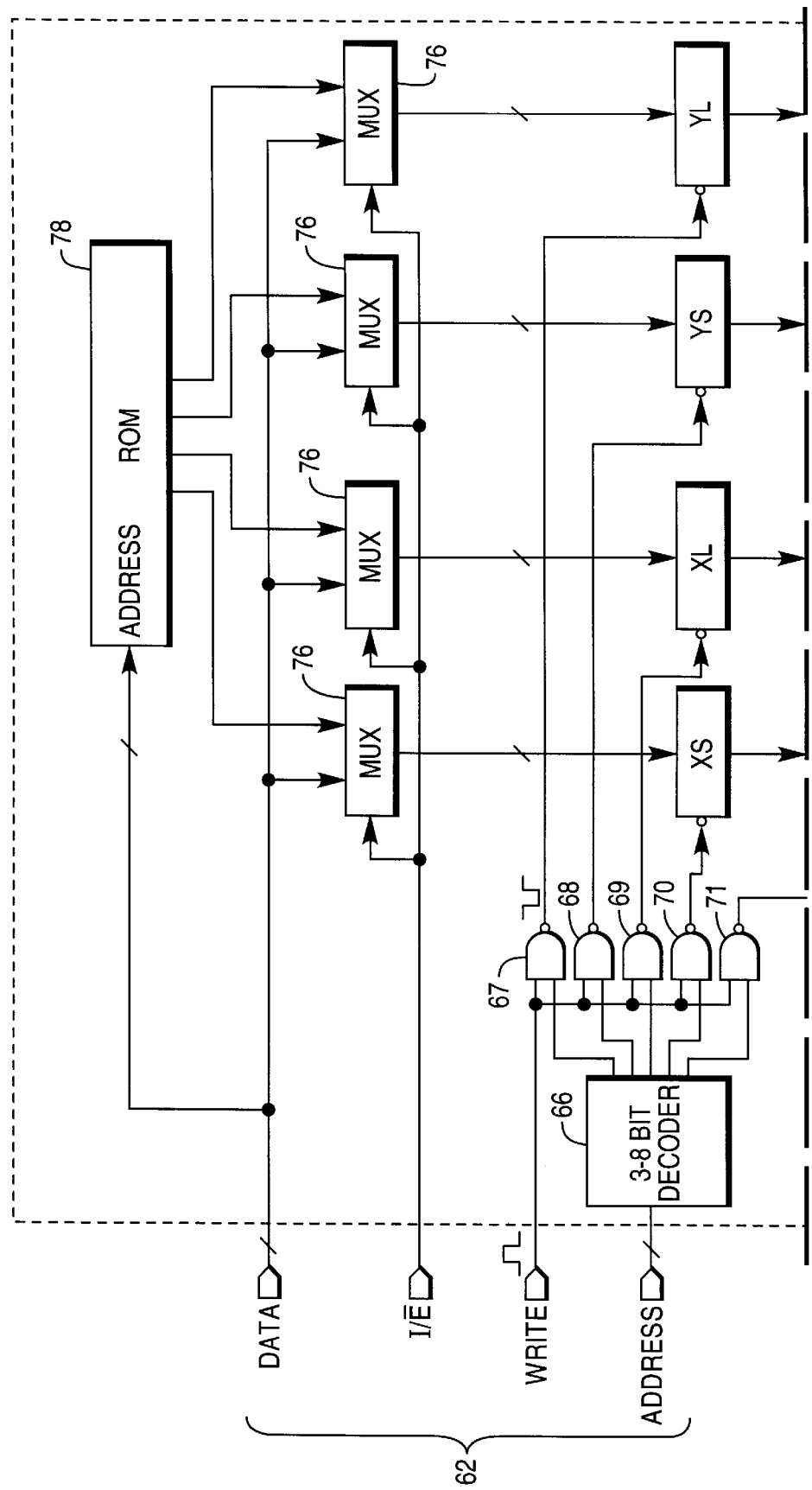
FIG. 15A–B shows an address controller with pan and tilt functionality.
Figure 15B:
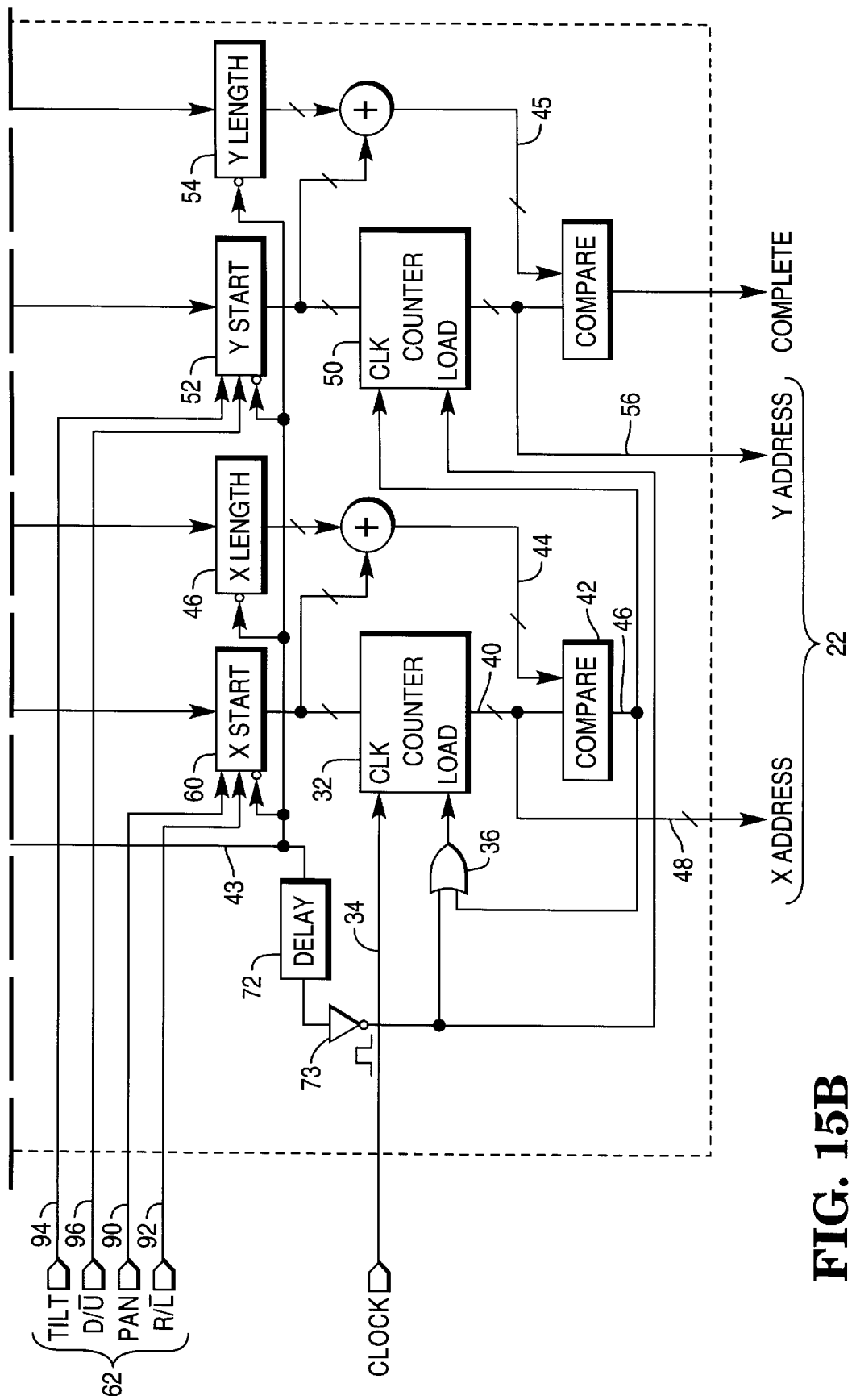
Figure 16A:
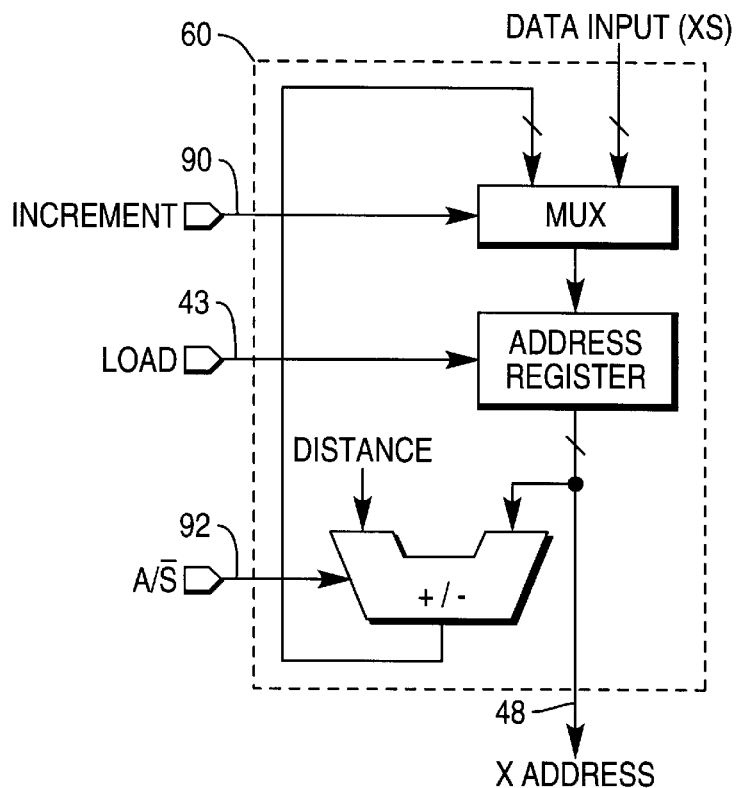
FIG. 16A–B shows the internal functionality for the XSTART and YSTART blocks of FIG. 15.
Figure 16B:
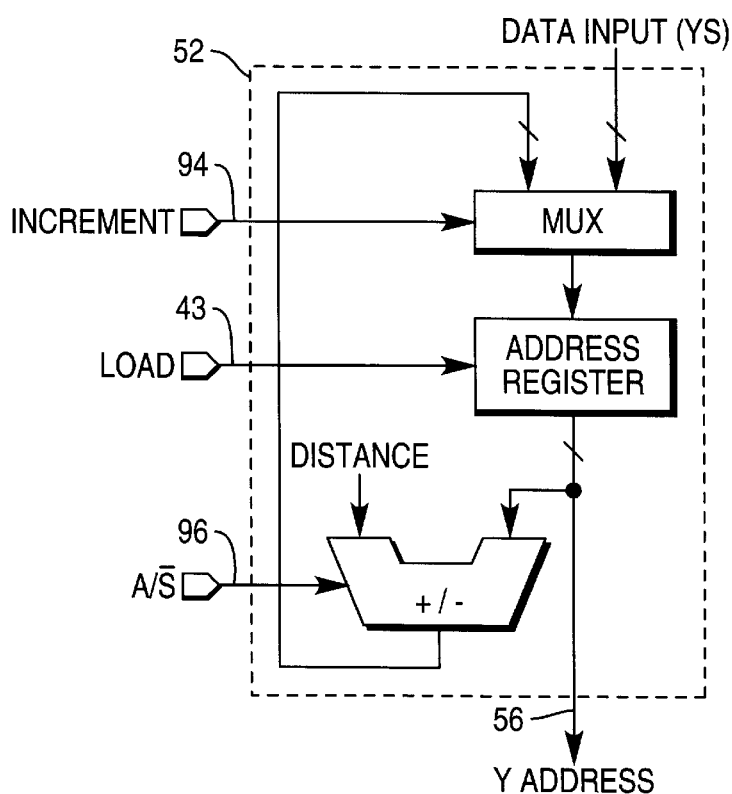

Pan and tilt functions are a movement of the region being output across the array in a horizontal or vertical direction, respectively. A master controller passes new addresses to the address controller of FIG. 10 or FIG. 12, for a pan or tilt operation, by moving the starting location some distance between frame scans to give the appearance of a continuous pan or tilt operation. Alternatively, the address controller calculates the new addresses based on an external pan or tilt command. This address controller is shown in FIG. 15. This is a simple modification of the address controller in FIG. 12, such that the XSTART and YSTART registers can be incremented internally. In FIG. 15, new inputs 90 and 92 have been added to control the internal increment operation of XSTART. FIG. 16A shows the implementation of the XSTART block 60 (the YSTART block 52 is similarly configured, as shown in FIG. 16B). A pan operation is done when a PAN control signal is asserted at 90. The PAN input causes the XSTART register to increment, adding to the XSTART value if the R/L~line 92 is high, and subtracting from the XSTART value if the R/L~line 92 is low. Likewise, TILT 94 and U/D~(up/down) 96 are used to increment the YSTART value for a tilt operation, as shown in FIG. 16B. The amount of the increment is determined by the DISTANCE value shown in FIGS. 16A–B. This may be a fixed value or a variable held in a register. Fast or slow pan or tilt operations could be done by changing the value of DISTANCE.

Zoom Functions

Figure 17A:
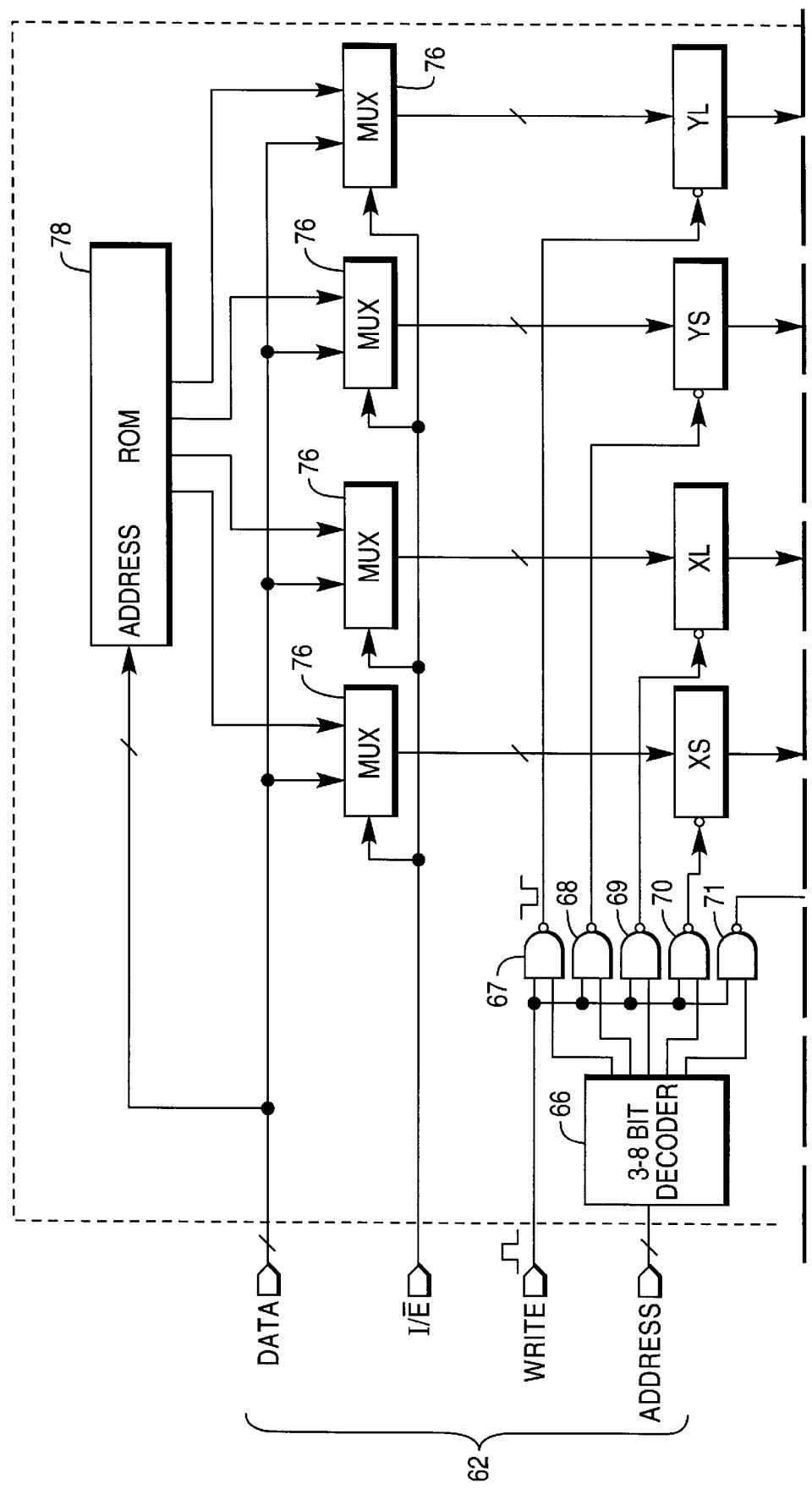
FIG. 17A–B shows an address controller with zoom functionality.
Figure 17B:
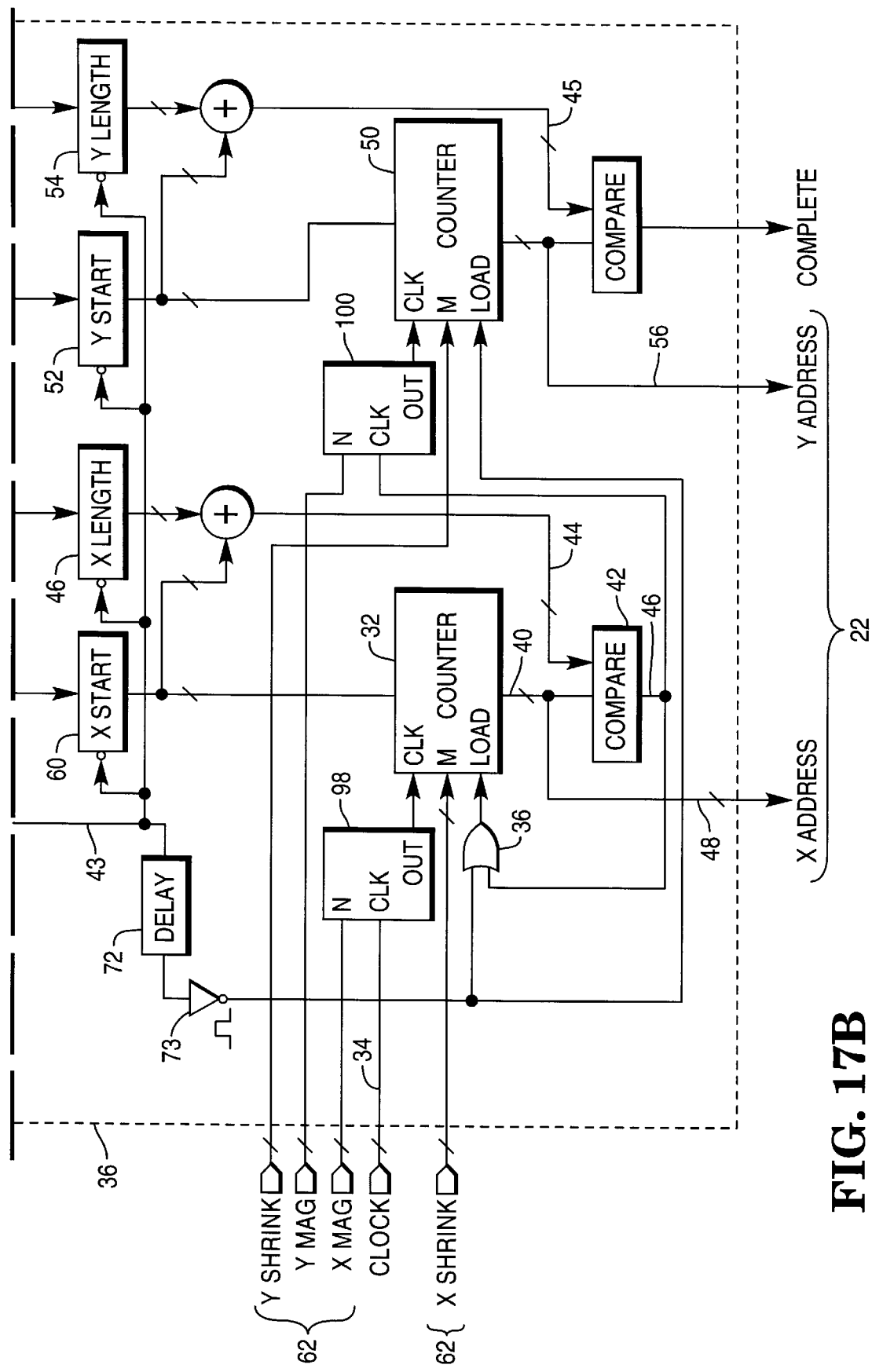

Zooming in magnifies a region of the sensor array by repeating pixels and lines, while zooming out shrinks a region of the array by skipping pixels and lines. Zoom operations with magnification or shrink factors not equal to an integer require signal processing for interpolation or decimation, which is best done in the camera signal processor. However, simple zoom for integer magnification or shrink factors can be done in the address controller. FIG. 17 shows an address controller capable of the zoom function. Divide by N counters 98 and 100 are used to feed the clock inputs of the X and Y address counters 32 and 50. In normal operation, N='1'. For magnification by a factor of N, the counters divide the clock frequency by N. For example, if XMAG='2', the X counter 32 increments at half the rate of the external clock. This keeps the X address value constant over two clock cycles, which repeats each pixel in a row. Likewise, if YMAG='2', the Y address counter 50 CLK input receives only half the pulses created by the X address counter compare line 46, so the Y address remains constant while the X address counter scans a line twice, which results in a repeated line. To shrink the image, XMAG and YMAG are set to '1' so the counter clocks are not affected, but the X and Y address counters must count by a shrink factor M.

Counting with an increment other than '1' is well known in digital design. In FIG. 17, the X and Y address counters can count by an arbitrary number M, which is input to each counter via the XSHRINK and YSHRINK inputs.

Block Transfer Mode

Figure 18:
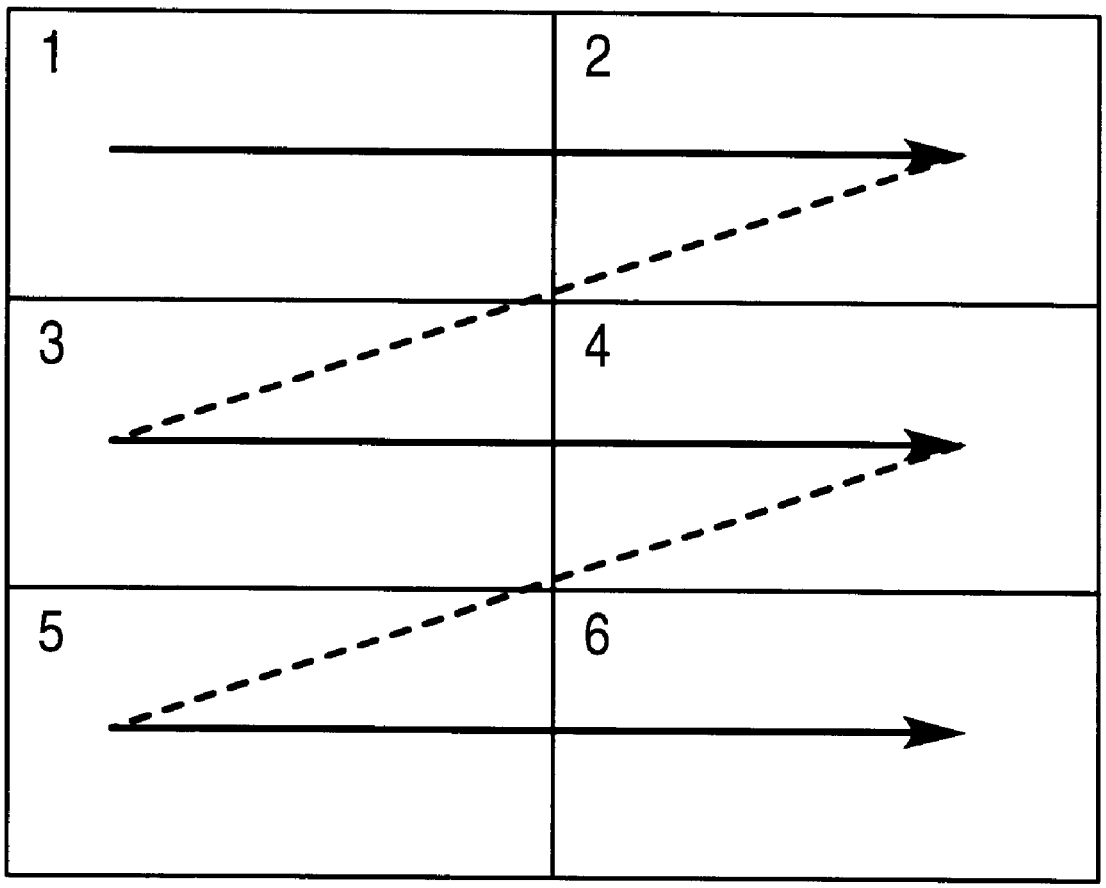
FIG. 18 shows an image sensor segregated into a plurality of blocks.

In block transfer mode, blocks of pixels are output from the sensor array, either in sequence or individually at the request of an external processor. For block-based compression methods (such as MPEG, JPEG, H.261), the pixel blocks are all the same size, and are processed in a given sequence. FIG. 18 shows such a sequence. A sensor array 14 is shown having 6 individual, non-overlapping, blocks 1–6. Each block is in turn composed of a plurality of individual sensor locations. Assuming sensor array 14 to be the same representative array used in FIG. 2, then each block would be composed of 8 individual sensors.

Reading data from a single block is done in a manner similar to that used in region mode. In a sense, block transfer mode can be though of as a multi-region address mode. Previously, while discussing region mode, a circuit for accessing multiple regions was described. This circuit, shown in FIG. 12, may be used to implement block transfer mode. By entering the XSTART, XLENGTH, YSTART and YLENGTH values for each block into the ROM 78, it is possible to read the sensors a block at a time.

Other implementations are also possible for a block-mode address controller. For example, it is possible to replace the ROM and the associated circuitry used to access the ROM by a finite-state machine. The finite-state machine would simply compute the values previously stored in the ROM as they are needed.

Figure 19:
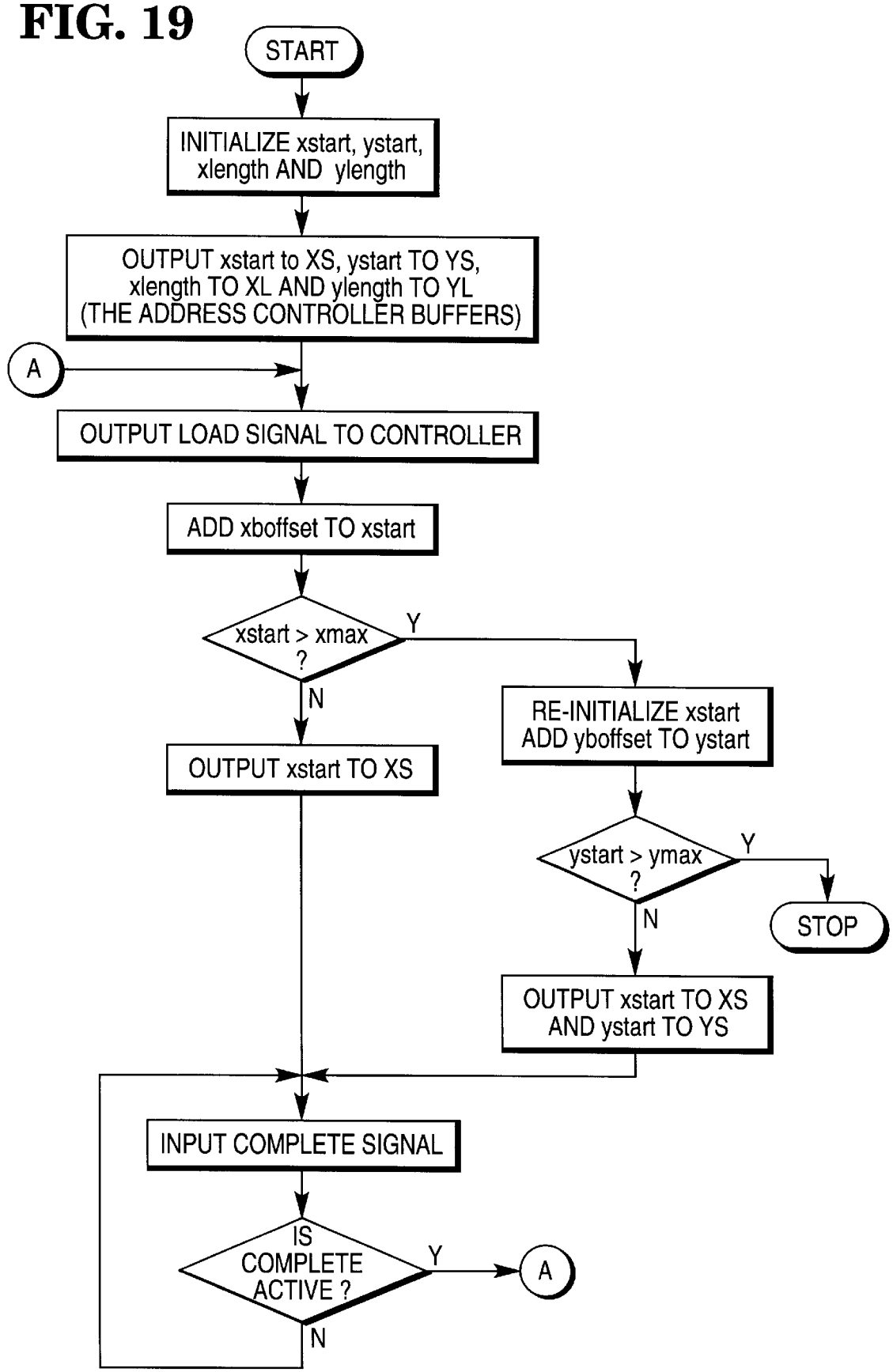
FIG. 19 is a flow-chart for the operation of a master controller achieving a block mode transfer of data from a programmable image sensor.

Instead of a ROM or a finite-state machine, a general purpose controller can be used to generate the XSTART, YSTART, XLENGTH, and YLENGTH values. FIG. 19 shows a flowchart describing a program for generating XSTART, YSTART, XLENGTH, and YLENGTH values.

FIG. 19 will now be described, but first a point should be made regarding the notation used in the figure. Since the figure describes a flow chart for a software program, it uses variable names (in lower case). When a capitalized name is used, it will correspond to a hardware register. For example, xlength is the name of a variable in a program and XLENGTH is the name of the corresponding buffer in hardware. Thus, when the general purpose processor sets a variable to a particular value, the corresponding hardware register is not affected. To affect a hardware register an I/O operation needs to take place.

Processing starts by initializing some variables. The variables xstart and ystart are set to values corresponding to the location of the first block to be read. Similarly, xlength and ylength are. set to the size of the block to be processed. In this implementation, it is assumed that all blocks are the same size, which means that xlength and ylength remain constant. These initial values are then loaded into the appropriate registers of FIG. 10. The readout process is then started by setting the appropriate address at the input of the controller in FIG. 10 and generating a WRITE signal.

While the address controller is generating addresses for reading out the sensors in the block, the program continues. Assuming that blocks are desired in the order assigned in FIG. 18, the next step is to increment the xstart location to that of the next block. The amount by which xstart is incremented is given by the variable xboffset, set to xlength when adjacent non-overlapping blocks are desired. After incrementing xstart, it is compared with xmax to see if we have reached the end of the array. The value of xmax should be one less than the width of the array since the decision is made based on a "greater than" condition.

If xstart is less than (or equal) to xmax, it means that xstart is a valid starting address for a block. This address is then loaded into XS for use in reading the next block. If the xstart value is larger than xmax, it means the there are no more blocks available in this "row" of blocks. To process the next "row" two things have to take place. First, the xstart variable is reset back to it initial value. Second, the ystart variable is incremented by yboffset. This is analogous to xboffset. As with xboffset, xyoffset is equal to ylength for the case of adjacent, non-overlapping blocks.

After incrementing the ystart variable, we must check whether it is a valid starting address for a block or not. This check is done in a manner similar to that used for xstart. The variable used to check ystart is ymax. If ystart is less than or equal than ymax, then the ystart is valid and both ystart and xstart are loaded into the YS and XS registers, respectively. If ystart is greater than ymax, we are done.

Assuming that there are more blocks to be read, the general purpose controller then enters a wait state. This waiting is accomplished by monitoring the COMPLETE signal (as shown in FIG. 11). By the complete signal becoming active, the general purpose controller is notified that the address controller is done reading the block. New address information is then loaded and the readout process restarted with the next block.

For the sake of simplicity FIG. 18 uses blocks which; i) are of equal size, ii) do not overlap, and iii) fit exactly over the sensor array 14. However, block mode needs not be restricted in such a way. Different sized blocks can easily be obtained by having different XLENGTH and YLENGTH values for each block to be read. These lengths may be stored in memory and accessed as needed. Or, assuming there is a functional relation between block order and block size, the size may be computed in the general purpose controller.

Overlapping blocks are obtained by using block offset values which are smaller than the corresponding block length. For example, to overlap blocks in the X direction one just needs to have xboffset smaller than XLENGTH. Similarly, if overlapping blocks in the Y direction are desired, one only needs to make yboffset smaller than YLENGTH. It should be noted that it is also possible to leave gaps between blocks by having the block offsets be larger than the corresponding block lengths.

Handling blocks that don't fit exactly over the array is no problem when the blocks cover LESS area than that of the array. In fact, region mode is an example where the block(s) doesn't include all the pixels in the array. For the case where the blocks cover MORE area than that of the array, FIGS. 20A–B show a circuit that can be used to handle the situation.

Figure 20A:
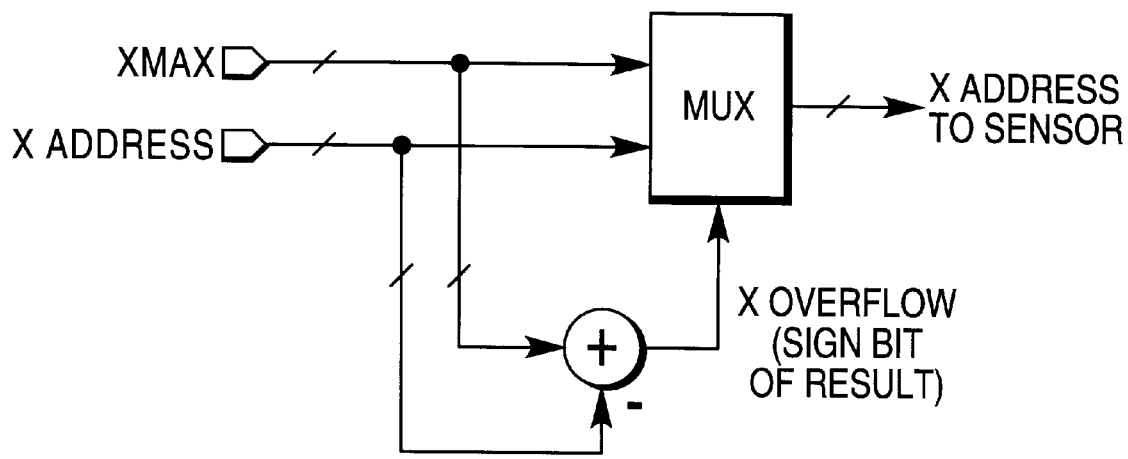
FIGS. 20A–20B show a circuit which support block mode transfer for block sizes greater than the size of the image array.
Figure 20B:
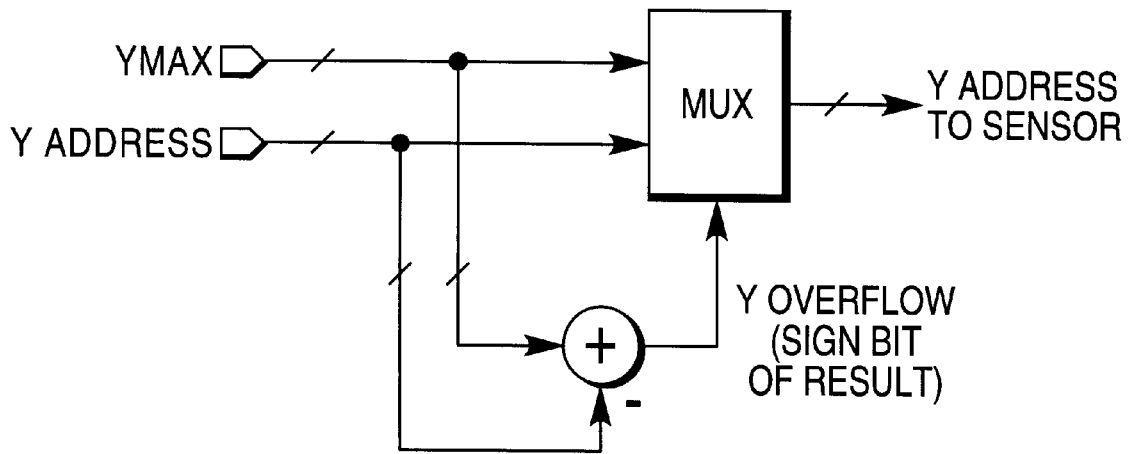

FIG. 20A will now be described (operation of FIG. 20B is similar except that it checks the Y ADDRESS instead of the X ADDRESS). Let XMAX be the largest allowable X ADDRESS that can be given to the sensor. The X ADDRESS supplied by the address controller is subtracted from XMAX and an X OVERFLOW signal (active HIGH) is generated. This overflow signal is just the sign bit of the arithmetic operation result. When the sign bit is zero (LOW), X ADDRESS is less than or equal to XMAX and can therefore be passed directly to the array. When the sign bit is one (HIGH), X ADDRESS is larger than XMAX and XMAX is then passed to the sensor array. This effectively duplicates the last row as many times as needed to produce a block of the desired size.

The overflow signal can also be used to modify the data coming from the sensor. More specifically, if duplicated rows are not desired, it is possible to use the overflow signal to effectively "blank out" the duplicated data.

The circuit of FIG. 20A is most useful when XMAX is not a power of two (minus 1). When XMAX is based on a power of two, then X ADDRESS is self-limiting due to wrapping.

The address controller can also work in concert with the master controller. Instead of sensor output data passing to a color processor (27 of FIG. 1), it could instead by fed back to a digital signal processor master controller (18 of FIG. 1). For instance, if automatic exposure control or automatic gain control is being done, the address controller could cause the image sensor to pass specific regions of the image to the signal processor for exposure calculations. If such functions are done image to image (i.e. the data from one image is used to correct gains for the next image), the address controller could keep track of very bright or very dark regions within the image, and then access those regions and to allow the signal processor to do computations using extreme pixel data. Incorporating some intelligence to do simple pixel comparisons of this nature avoids passing pixel addresses back and forth several times between the signal processor and the address controller.

In summary, combining an address controller in the sensor chip provides the following advantages. First, fewer pins are needed on the sensor chip and on the chips which communicate with the sensor chip (i.e. the camera DSP). This lowers cost and reduces power (by reducing IO activity). Secondly, pixel data can be provided from the sensor in a format suitable for compression (i.e. 8×8 blocks for JPEG compression) or other operations (pan, tilt, zoom). This pre-formatted output can eliminate the need for a frame buffer or line buffers to convert from raster scan to other formats. This lowers system cost. Thirdly, less intelligence is required external to the sensor, making it easier for people to use the sensor with their own custom chips. Lastly, overall system throughput is improved by reducing the amount of data/control information that must be exchanged between various sub-systems within an electronic camera, and between an electronic camera and other system(s) in communication therewith.

While we have illustrated and described the preferred embodiments of our invention, it is to be understood that we do not limit ourselves to the precise constructions herein disclosed, and the right is reserved to all changes and modifications coming within the scope of the invention as defined in the appended claims.

We claim:

1. An integrated circuit, comprising:
   an image sensor array comprising a plurality of pixels;
   a first processor that generates addressing parameters defining at least a region of the image sensor array, the region comprising more than one of the plurality of pixels; and
   a second processor, separate from and in communication with the first processor, wherein the second processor is operable to receive the addressing parameters, generate addresses for the pixels in the region of the image sensor array based on the parameters, and address the pixels in the region of the image sensor array;
   wherein the image sensor array, the first processor, and the second processor are configured as part of a single integrated circuit.

2. The integrated circuit of claim 1 wherein the second processor includes means for sequentially addressing the image sensor array.

3. The integrated circuit of claim 1 wherein the second processor includes means for addressing any region of the image sensor array.

4. The integrated circuit of claim 1 wherein the second processor includes means for addressing blocks of the image sensor array.

5. The integrated circuit of claim 1 wherein the second processor includes means for panning images sensed by the image sensor array.

6. The integrated circuit of claim 1 wherein the second processor includes means for tilting images sensed by the image sensor array.

7. The integrated circuit of claim 1 wherein the second processor includes means for zooming images sensed by the image sensor array.

8. The integrated circuit of claim 1, wherein the second processor comprises at least one first register for maintaining a starting address for pixels to be output by the image sensor array.

9. The integrated circuit of claim 8 wherein the second processor comprises at least one second register for maintaining an ending address for pixels to be output by the image sensor array.

10. The integrated circuit of claim 8 wherein the second processor comprises at least one second register for maintaining an amount of pixels to be output by the image sensor array.

11. The integrated circuit of claim 8 wherein the second processor comprises a read-only memory coupled to the at least one first register.

12. The integrated circuit of claim 1, wherein the first processor is operable to present at least one reference address to the second processor.

13. The integrated circuit of claim 12 wherein the at least one reference address is a starting address for pixels to be output by the image sensor array.

14. The integrated circuit of claim 1 further comprising means for detecting a bad pixel in the image sensor array.

15. The integrated circuit of claim 14 further comprising means for correcting data corresponding to the bad pixel.

16. The integrated circuit of claim 1, wherein the second processor is operable to address the pixels in the region of the image sensor array without receiving the address of each pixel in the array.

17. A programmable image sensor, comprising:

an image sensor array;

programmable means for generating addresses for the image sensor array, the programmable means operable to provide random access to at least one pixel of the image sensor array; and a digital signal processor master controller, independent from and coupled with said programmable means for generating addresses, the digital signal processor master controller being operable to generate addressing parameters that program the programmable means for generating address;

wherein said digital signal processor master controller, said image sensor array, and said programmable means for generating addresses are configured as separate units of an integrated circuit.

18. The programmable image sensor of claim 17 wherein the programmable means for generating addresses [further comprises] includes an address controller and a plurality of registers.

19. The programmable image sensor of claim 18 wherein the plurality of registers are programmed by said digital signal processor master controller.

20. The programmable image sensor of claim 19 wherein the master controller is coupled to the programmable image sensor by a bus comprising address, data and control signals.

21. An electronic camera, comprising:

a lens for receiving an image to be captured;

a programmable integrated circuit comprising an image sensor array, an address controller, a digital signal processor master controller coupled with said address controller, and an interface; and a microprocessor coupled to the interface;

wherein said digital signal processor master controller is separate from said address controller and wherein said digital signal processor master controller is operable to generate addressing parameters to program the address controller.

22. The camera of claim 21 wherein the integrated circuit provides pre-formatted image data from the image sensor array.

23. The camera of claim 22 wherein the pre-formatted data represents any particular region of the image sensor array.

24. The camera of claim 22 wherein the pre-formatted data represents a particular block of the image sensor array.

25. The integrated circuit of claim 21 further comprising means for detecting a bad pixel in the image sensor array.

26. The integrated circuit of claim 25 further comprising means for correcting data corresponding to the bad pixel.

27. A method of operating an image sensor comprising:

coupling an address controller with a digital signal processor master controller located separately from said address controller on an integrated circuit;

generating addressing parameters using the digital signal processor master controller;

programming the address controller, using the addressing parameters, for generating image addresses for randomly addressing data within an image sensor, wherein the address controller and the image sensor are configured as part of a single integrated circuit; and outputting data from the image sensor in response to the image addresses.

28. The method of claim 27 wherein the programming step programs the address controller to generate addresses that correspond to a region.

29. The method of claim 27 wherein the programming step programs the address controller to generate addresses that correspond to a pan operation.

30. The method of claim 27 wherein the programming step programs the address controller to generate addresses that correspond to a tilt operation.

31. The method of claim 27 wherein the programming step programs the address controller to generate addresses that correspond to a zoom operation.

32. The method of claim 27 wherein the programming step programs the address controller to generate addresses that correspond to a block transfer mode.

33. An image sensing integrated circuit, comprising:

an image sensor array comprising a first plurality of pixels, each pixel having a unique address, wherein each pixel is operable to transmit an output value in response to being addressed;

a master controller that produces address generation parameters that define at least a contiguous region of the image sensor array, wherein the region includes a second plurality of the pixels;

an address generation processor, distinct from the master controller, that receives the address generation parameters and produces the unique addresses for the second plurality of pixels in the region and that addresses the pixels of the region in raster order; and a control interface that provides communication between the master controller and the address generation processor, the control interface comprising a general purpose bus;

wherein the address generation processor receives the address generation parameters from the master controller via the control interface, and wherein a single integrated circuit comprises the image sensor, the master controller, the address generation processor and the control interface.

34. The image sensing integrated circuit of claim 33, wherein the address generation processor includes means for sequentially addressing the image sensor array.

35. The image sensing integrated circuit of claim 33 wherein the address generation processor includes means for addressing any region of the image sensor array.

36. The image sensing integrated circuit of claim 33 wherein the address generation processor includes means for addressing blocks of the image sensor array.

37. The image sensing integrated circuit of claim 33 wherein the address generation processor includes means for panning images sensed by the image sensor array.

38. The image sensing integrated circuit of claim 33 wherein the address generation processor includes means for tilting images sensed by the image sensor array.

39. The image sensing integrated circuit of claim 33 wherein the address generation processor includes means for zooming images sensed by the image sensor array.

40. The image sensing integrated circuit of claim 33, wherein the address generation processor comprises at least one first register for maintaining a starting address for pixels to be output by the image sensor array.

41. The image sensing integrated circuit of claim 40 wherein the address generation processor comprises at least one second register for maintaining an ending address for pixels to be output by the image sensor array.

42. The image sensing integrated circuit of claim 40 wherein the address generation processor comprises at least one second register for maintaining an amount of pixels to be output by the image sensor array.

43. The image sensing integrated circuit of claim 40 wherein the address generation processor comprises a read-only memory coupled to the at least one first register.

44. The image sensing integrated circuit of claim 33, wherein the master controller is operable to present at least one reference address to the address generation processor.

45. The image sensing integrated circuit of claim 44 wherein the at least one reference address is a starting address for pixels to be output by the image sensor array.

46. The image sensing integrated circuit of claim 33 further comprising means for detecting a bad pixel in the image sensor array.

47. The image sensing integrated circuit of claim 46 further comprising means for correcting data corresponding to the bad pixel.

* * * * *